United States Patent
Nagano et al.

(10) Patent No.: US 11,287,578 B2
(45) Date of Patent: Mar. 29, 2022

(54) MULTICAST SWITCH

(71) Applicant: NTT Electronics Corporation, Yokohama (JP)

(72) Inventors: Mitsuru Nagano, Yokohama (JP); Tatsuya Yoshii, Yokohama (JP); Masahiro Yanagisawa, Yokohama (JP); Tatsunori Nakahashi, Yokohama (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 0 days.

(21) Appl. No.: 16/982,491

(22) PCT Filed: Mar. 26, 2019

(86) PCT No.: PCT/JP2019/012731
§ 371 (c)(1),
(2) Date: Sep. 18, 2020

(87) PCT Pub. No.: WO2019/189105
PCT Pub. Date: Oct. 3, 2019

(65) Prior Publication Data
US 2021/0018692 A1    Jan. 21, 2021

(30) Foreign Application Priority Data
Mar. 29, 2018  (JP) .............................. JP2018-065693

(51) Int. Cl.
*G02B 6/35*     (2006.01)
*G02B 6/12*     (2006.01)
*G02F 1/313*    (2006.01)

(52) U.S. Cl.
CPC ............. *G02B 6/3546* (2013.01); *G02B 6/12* (2013.01); *G02F 1/313* (2013.01); *G02B 2006/12145* (2013.01)

(58) Field of Classification Search
None
See application file for complete search history.

(56) References Cited

U.S. PATENT DOCUMENTS

| 5,729,642 A | 3/1998 | Thaniyavarn |
| 10,634,851 B2 * | 4/2020 | Steinbrecher ........ G02B 6/3542 |

(Continued)

FOREIGN PATENT DOCUMENTS

| JP | H09-297230 A | 11/1997 |
| JP | 2003-5231 A | 1/2003 |

(Continued)

OTHER PUBLICATIONS

W. S. Hu and Q. J. Zeng, "Multicasting optical cross connects employing splitter-and-delivery switch," in IEEE Photonics Technology Letters, vol. 10, No. 7, pp. 970-972, Jul. 1998, doi: 10.1109/68.681287. (Year: 1998).*

(Continued)

*Primary Examiner* — Rhonda S Peace
(74) *Attorney, Agent, or Firm* — Workman Nydegger

(57) ABSTRACT

There is provided a small MCS with the number of leads reduced by half as compared with the conventional configuration. A multicast switch according to the present invention is formed on a substrate, comprising: M input ports, N output ports; M×N optical switch units (optical SU); optical waveguides optically connecting the M input ports, M×N optical SU, and N output ports; and leads connected to the respective M×N optical SU. A multicast switch is configured such that by activating one optical SU, an optical signal input to an input port associated with the activated optical SU is output from an output port associated with the activated optical SU. The M×N optical SU include at least (Continued)

a gate switch and a main switch. In each optical SU, the gate switch and the main switch are connected to the common lead.

17 Claims, 20 Drawing Sheets

(56) References Cited

U.S. PATENT DOCUMENTS

| | | | |
|---|---|---|---|
| 2013/0322815 A1* | 12/2013 | Watanabe | G02F 1/3137 385/17 |
| 2016/0337731 A1 | 11/2016 | Graves | |
| 2020/0408990 A1* | 12/2020 | Senoo | G02B 6/12007 |
| 2021/0018692 A1* | 1/2021 | Nagano | G02B 6/12 |

FOREIGN PATENT DOCUMENTS

| JP | 2003005231 A | * | 1/2003 |
|---|---|---|---|
| JP | 2006-38897 A | | 2/2006 |
| JP | 2006038897 A | * | 2/2006 |
| JP | H59-13139 A | | 4/2016 |

OTHER PUBLICATIONS

M. Moralis-Pegios et al., "Multicast-Enabling Optical Switch Design Employing Si Buffering and Routing Elements," in IEEE Photonics Technology Letters, vol. 30, No. 8, pp. 712-715, Apr. 15, 2018, doi: 10.1109/LPT.2018.2813012. (Year: 2018).*

International Search Report dated Jun. 18, 2019, issued in PCT Application No. PCT/JP2019/012731, filed Mar. 26, 2019.

International Preliminary Report on Patentability dated Sep. 29, 2020, issued in PCT Application No. PCT/JP2019/012731, filed Mar. 26, 2019.

Office Action dated Oct. 5, 2021 in corresponding Japanese Patent Application No. 2018-065693.

Himeno et al., "Silica-based low loss and high extinction ratio 8×8 thermo-optic matrix switch with path-independent loss arrangement using double Mach-Zehnder interferometer switching units", Proceedings of 22nd European Conference on Optical Communication(ECOC96), IEEE, Sep. 19, 1996, ThD.2.2, pp. 4.149-4. 152.

Nakamura et al., "Wavelength selective switching with one-chip silicon photonic circuit including 8×8 matrix switch", 2011 Optical Fiber Communication Conference and Exposition and the National Fiber Optic Engineers Conference, OTuM2, IEEE, Mar. 6, 2011, pp. 1-3.

* cited by examiner

MULTICAST SWITCH

TECHNICAL FIELD

The present invention relates to an optical switch, and more specifically, relates to a multicast switch usable in an optical communications system.

BACKGROUND ART

A reconfigurable optical add/drop multiplexer (ROADM) is an essential device for optical network construction since it can arbitrarily select a path of an optical wavelength multiplex signal in an optical fiber transmission channel for each wavelength without converting the signal into an electrical signal. A ROADM requires an optical switch that freely allocates a wavelength and an input/output port.

A ROADM generally uses a multicast switch (MCS) obtained by combining an optical switch with an optical splitter (optical coupler), which is an optical device smaller than a wavelength selection switch and a matrix optical switch (see PTL 1 for example). The use of an MCS has the advantage of realizing a small and economical ROADM. In the future, the number of wavelengths is expected to increase and an MCS needs to be further downsized.

As a basic optical switch configuration in a ROADM using an MCS, there is a Mach-Zehnder interferometer 2×2 optical switch (MZI optical switch) using quartz waveguides. An MZI optical switch can change a path through which an optical signal passes by providing thermooptic phase shifters (thin-film heaters) near two arm waveguides and controlling activation/deactivation of the thin-film heaters.

FIG. 1 is a diagram showing an example of a conventional MZI optical switch. The MZI optical switch shown in FIG. 1 comprises input optical waveguides 11a and 11b, thin-film heaters 12a and 12b, directional couplers 13-1 and 13-2, two arm waveguides 14a and 14b, leads 15a to 15d as drive electrical wiring for feeding the thin-film heaters 12a and 12b, and output optical waveguides 16a and 16b. In the case of using the MZI optical switch shown in FIG. 1 as a 1×2 optical switch, one of the input optical waveguides 11a and 11b becomes an unconnected waveguide. In the case of using the switch as a 2×1 optical switch, one of the output optical waveguides 16a and 16b becomes an unconnected waveguide.

In the MZI optical switch shown in FIG. 1, the two arm waveguides 14a and 14b are generally designed to have a half-wave optical path length difference. Accordingly, in a case where the thin-film heaters 12a and 12b are not driven (fed) and the half-wave optical path length difference between the two arm waveguides 14a and 14b is not cancelled, an optical signal path is a bar path (from the input optical waveguide 11a to the output optical waveguide 16a/from the input optical waveguide 11b to the output optical waveguide 16b). In a case where the thin-film heaters 12a and 12b are driven and the half-wave optical path length difference is cancelled by the thermooptic effect, an optical signal path is a cross path (from the input optical waveguide 11a to the output optical waveguide 16b/from the input optical waveguide 11b to the output optical waveguide 16a). In a case where the half-wave optical path length difference is not provided between the two arm waveguides 14a and 14b, the above operation is reversed in the MZI optical switch shown in FIG. 1. That is, activation/deactivation of the MZI optical switch can be controlled via activation/deactivation of the thin-film heaters 12a and 12b by controlling feeding by the leads 15a to 15d.

Since the MZI has no directivity, the terms "input port" and "output port" are used only for the sake of identification and each of them can be used for both input and output.

FIG. 2 is a diagram showing an example of an MCS formed by a conventional MCS having four inputs and four outputs (hereinafter referred to as a 4×4 MCS) using MZI optical switches. FIG. 2 shows an MCS comprising four input ports $In_1$ to $In_4$ and output ports $Out_1$ to $Out_4$ each connected to an optical waveguide, 1×2 splitters SP, gate switches $GSW_{1,1}$ to $GSW_{4,4}$ that are 1×2 switches, main switches $MSW_{1,1}$ to $MSW_{4,4}$ that are 2×1 switches, leads 15 for controlling activation/deactivation of GSW and MSW, and ground lines 17 for grounding GSW and MSW. As GSW and MSW, MZI optical switches as shown in FIG. 1 are used. In a conventional MCS, a bend radius of an optical waveguide is large. Thus, for downsizing, it has been advantageous to use the structure of reducing the longitudinal direction, not the structure of bending. Accordingly, there has been a need for an arrangement in which GSW and MSW are staggered vertically to make up gaps (nested arrangement).

The 1×2 splitters SP are asymmetrical splitters and a splitting ratio is sequentially set at 3:1, 2:1, and 1:1 from a 1×2 splitter SP in the first line onward. This is to prevent a difference in optical output between the output ports.

The 4×4 MCS shown in FIG. 2 has a pair of GSW and MSW whose activation/deactivation is controlled in a case where an optical signal input to a specific input port is output from a specific output port, and this pair constitutes an optical switch unit SU. For example, an optical signal input to the input port $In_1$ can be output from the output port $Out_1$ by controlling activation/deactivation of $GSW_{1,1}$ and $MSW_{1,1}$. The optical switch unit SU can be classified into a configuration of SUa shown in FIG. 3 and a configuration of SUb shown in FIG. 4.

FIG. 3 is a diagram showing a configuration of conventional SUa. FIG. 3 shows SUa including a 1×2 splitter SP, GSW, and MSW. As shown in FIG. 3, SUa is a 1×2 switch combined with a splitter having first and second input ends a and b and first and second output ends c and d.

GSW and MSW are connected to different leads 15 and ground lines 17 and each have one output end connected to a termination waveguide e. GSW and MSW have the function of a crossbar switch, that is, each of them enters a bar state (connected to the termination waveguide e) in an inactive state in which no voltage is applied and enters a cross state (transmission state) in an active state in which voltage is applied via the lead 15.

As shown in FIG. 3, a first optical signal input from the first input end a of SUa is branched into two by the 1×2 splitter SP. One branch of the first optical signal is coupled to the first output end c of SUa and the other branch of the first optical signal is coupled to the input end of GSW. GSW enters the bar state and outputs the first optical signal to the termination waveguide e in the inactive state, and enters the cross state and outputs the optical signal to MSW in the active state.

MSW receives input of the first optical signal from the first input end a of SUa via GSW and input of a second optical signal from the second input end b of SUa. MSW enters the bar state and outputs the second optical signal to the second output end d of SUa in the inactive state, and enters the cross state, outputs the second optical signal to the termination waveguide e, and outputs the first optical signal to the second output end d of SUa in the active state.

FIG. 4 is a diagram showing a configuration of conventional SUb. FIG. 4 shows SUb including a gate switch GSW, a main switch MSW, and leads 15. As shown in FIG. 4, SUb is a 2×1 switch having first and second input ends a and b and an output end d. GSW and MSW are connected to different leads 15 and ground lines 17.

As shown in FIG. 4, a first optical signal input from the first input end a of SUb is coupled to the input end of GSW. GSW enters the bar state and outputs the first optical signal to the termination waveguide e in the inactive state, and enters the cross state and outputs the optical signal to MSW in the active state.

MSW receives input of the first optical signal from the first input end a of SUb via GSW and input of the second optical signal from the second input end b of SUb. MSW enters the bar state and outputs the second optical signal to the output end d of SUb in the inactive state, and enters the cross state, outputs the second optical signal to the termination waveguide e, and outputs the first optical signal to the output end d of SUb in the active state.

CITATION LIST

Patent Literature

PTL 1: Japanese Patent No. 5913139

SUMMARY OF INVENTION

Technical Problem

In the case of the conventional 4×4 MCS shown in FIG. 2, since it is necessary to connect GSW and MSW to different leads 15, the necessary number of leads 15 is (4×4)×2=32. In the conventional 4×4 MCS shown in FIG. 2, the leading direction of leads 15 is a direction perpendicular to the direction of input/output of signal light because of necessity to lay out the leads 15 without any intersection on the substrate and ease of work/process. Accordingly, there has been a problem that 32 leads 15 are arrayed and a large area is occupied by the 32 leads 15. Further, in the case of an M×N MCS, since the necessary number of leads is (M×N)×2, there has been a problem that the number of leads increases with the number of input/output ports and their footprint becomes larger.

In addition, in the conventional 4×4 MCS shown in FIG. 2, a ground line 17 is provided for each array of MZI optical switches connected to the leads 15. Thus, the footprint of electrical wiring further becomes larger by including the ground lines 17.

On the other hand, a reduction in the line width of the leads 15 or the interval between the leads 15 is considered as a measure to suppress an increase in footprint of electrical wiring. However, in consideration of the amount of current necessary for driving the thin-film heaters 12, there is a limit due to a high possibility of a break or short circuit caused by heater driving current and it is difficult to further reduce the line width or interval.

As described above, there is a problem that as the scale of an optical circuit and the number of channels are increased, the ratio of electrical wiring such as leads 15 and ground lines 17 to the substrate is also increased, which becomes an obstacle to downsizing of an optical switch.

The present invention has been accomplished in view of the above problem. The object of the present invention is to provide a small multicast switch with a reduced number of leads.

Solution to Problem

A multicast switch according to an aspect of the present invention is formed on a high-refractive-index waveguide substrate, comprising: M input ports to which optical signals are input, the input ports being associated with different numbers out of first numbers $1, \ldots, M$; N output ports from which the optical signals are output, the output ports being associated with different numbers out of second numbers $1, \ldots, N$; M×N optical switch units associated with different pairs of numbers [m, n], where m is an integer satisfying $1 \leq m \leq M$ and corresponds to the first numbers and n is an integer satisfying $1 \leq n \leq N$ and corresponds to the second number, optical waveguides optically connecting the M input ports, the M×N optical switch units; and the N output ports, and leads connected to the M×N optical switch units, respectively, to control activation/deactivation of the optical switch units, wherein by activating one optical switch unit of the M×N optical switch units, an optical signal input to the input port associated with the first number associated with the activated optical switch unit is output from the output port associated with the second number associated with the activated optical switch unit, the M×N optical switch units include at least a gate switch that is a 1×1 switch and a main switch that is a 2×1 switch provided in a subsequent stage of the gate switch, and in each of the optical switch units, the gate switch and the main switch are connected to the common lead.

Advantageous Effects of Invention

According to the multicast switch of the present invention, downsizing of the MCS can be realized.

DESCRIPTION OF EMBODIMENTS

As a result of careful consideration of an operation state of an optical switch, the inventors have found out that active MZI optical switches are not totally randomly present on an M×N matrix but are present under a certain restriction. That is, the inventors have found out that in a case where either one of GSW and MSW in SU is activated, the other is simultaneously activated, and similarly, in a case where either one is deactivated, the other is simultaneously deactivated. In view of such a restriction condition, if leads of GSW and MSW in SU can be shared and concentrated, the footprint of the leads can be reduced.

Figure 5:
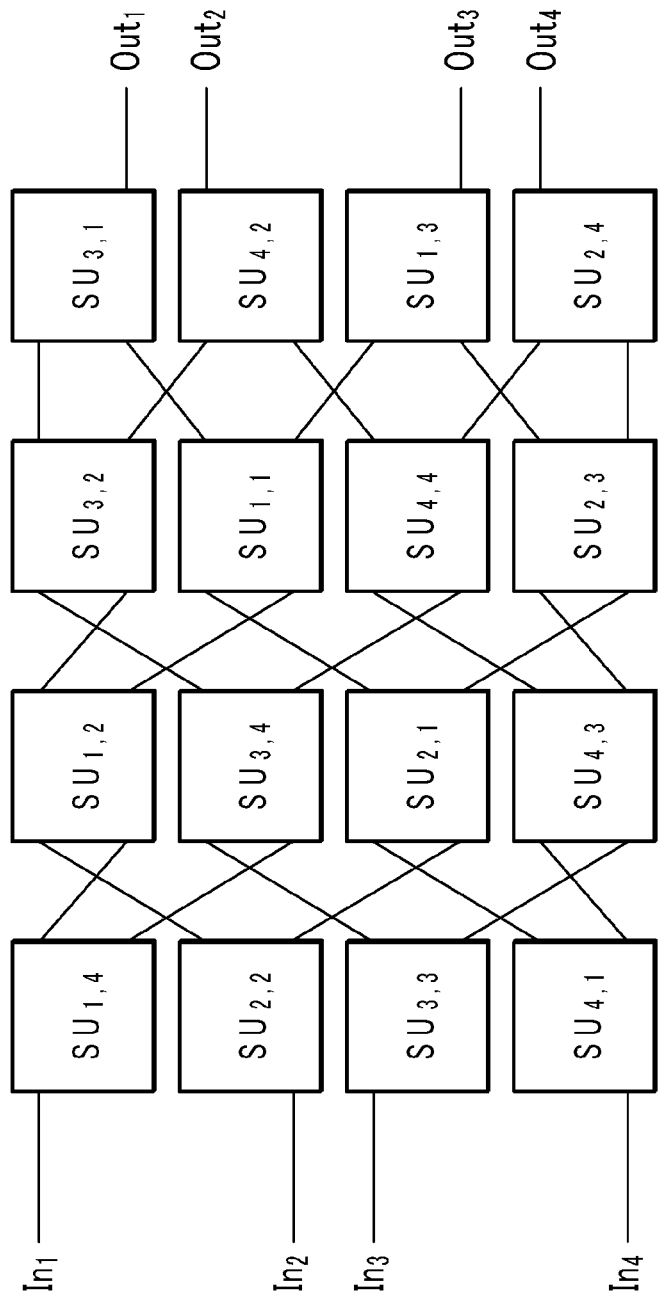
FIG. 5 is a diagram for explaining the operation of a 4×4 MCS.

FIG. 5 is a diagram for explaining the operation of a 4×4 MCS. In FIG. 5, illustration of wiring is omitted. FIG. 5 shows 16 optical switch units $SU_{1,1}$ to $SU_{4,4}$. In the 4×4 MCS, $SU_{3,1}$, $SU_{4,2}$, $SU_{1,3}$, and $SU_{2,4}$ connected to output ports $Out_1$ to $Out_4$, respectively, are SUb and the other optical switch units are SUa. An optical signal input from an optical switch unit SUa passes through two optical switch units SUa and is then output from an output side optical switch unit SUb.

In a case where voltage is applied to none of the optical switch units SU, since all optical signals from input ports $In_1$ to $In_4$ are connected to the termination waveguides e, the signals are not output to the output ports $Out_1$ to $Out_4$. For example, since an optical signal from the input port $In_1$ is connected to the termination waveguide e at $SU_{1,3}$, the signal is not output to the output ports $Out_1$ to $Out_4$. Similarly, since the input ports $In_2$ to $In_4$ are connected to the termination waveguides e at $SU_{2,4}$, $SU_{3,1}$, and $SU_{4,2}$, respectively, signals are not output to the output ports $Out_1$ to $Out_4$.

For example, an optical signal from the input port $In_2$ can be output to the output port $Out_3$ by applying voltage to $SU_{2,3}$. At this time, the optical signal from the input port $In_2$ passes through $SU_{2,2}$ and $SU_{2,1}$ in the bar state, active $SU_{2,3}$ in cross state, and $SU_{1,3}$ in the bar state, and is then output from the output port $Out_3$.

Figure 6:
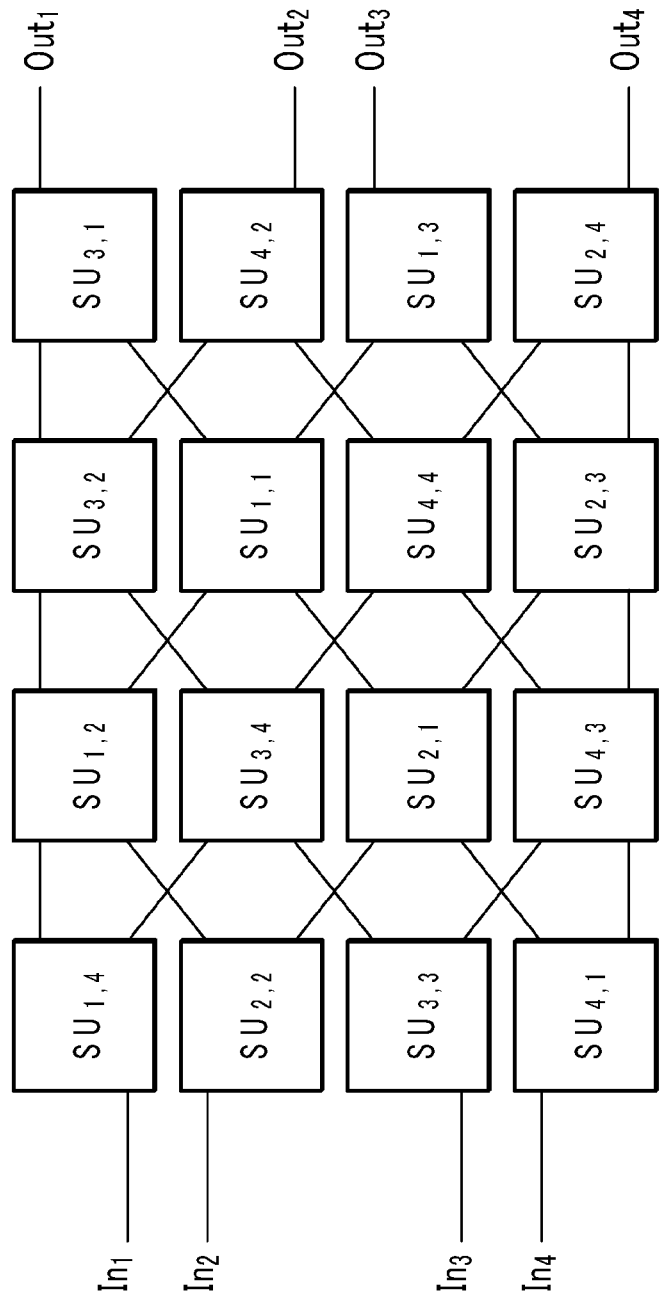
FIG. 6 is a diagram for explaining the operation of a 4×4 MCS having a different configuration.

In a case where the setting of the function of SU is reversed such that a switch enters the cross state (connected to the termination waveguide) in a normal state in which no voltage is applied and enters the bar state (transmission state) in a voltage-applied state, the layout is as shown in FIG. 6.

In the case of an M×N MCS, SU includes M×(N−1) optical switch units (SUa) and M optical switch units (SUb) connected to output ports. An optical signal input from $In_M$ can be output to $Out_n$ by controlling activation/deactivation of $SU_{m,n}$.

First Embodiment

Figure 7:
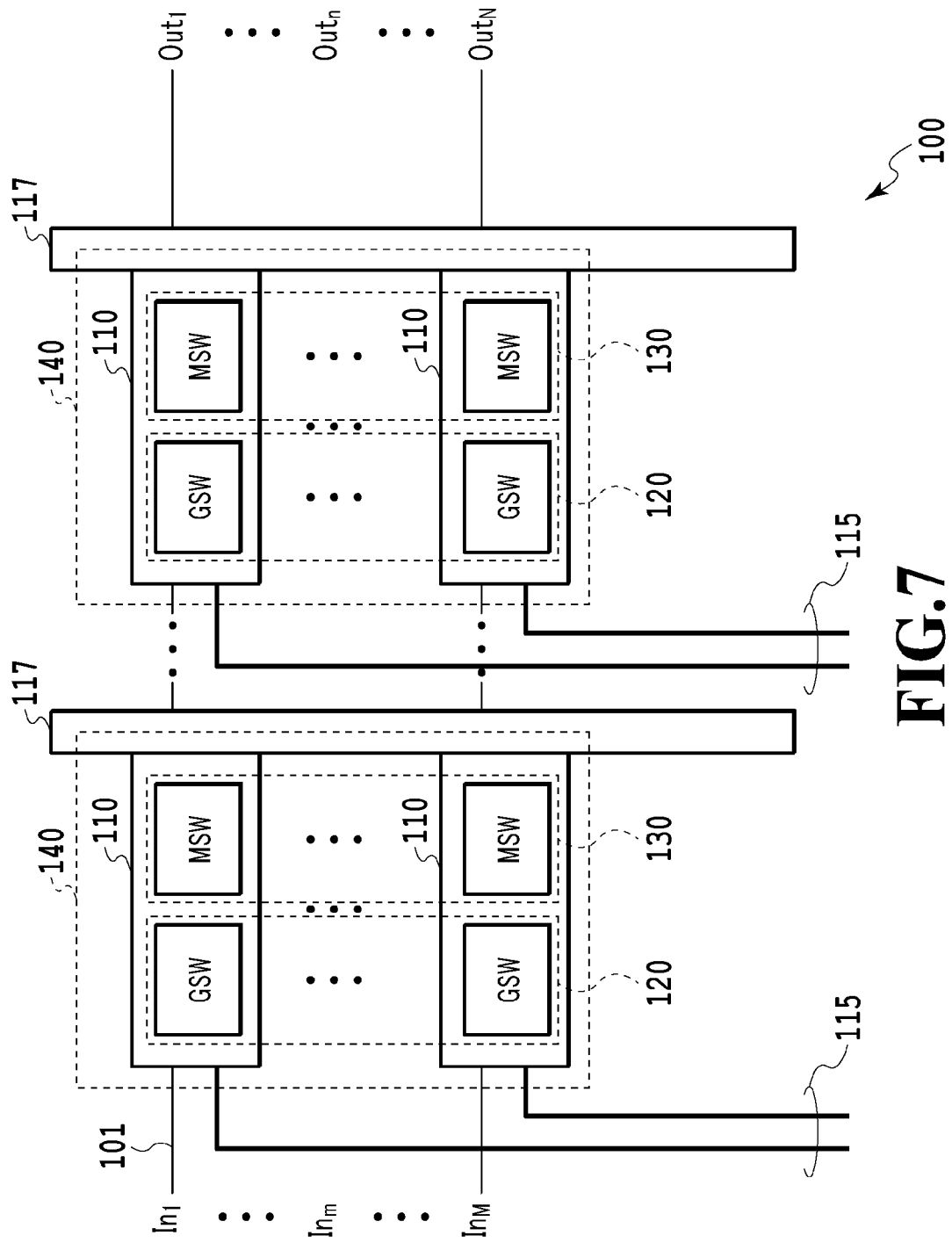
FIG. 7 is a diagram showing a simplified example of a configuration of an M×N MCS according to a first embodiment of the present invention.

FIG. 7 is a diagram showing a simplified example of a configuration of an M×N MCS 100 (each of M and N is an integer not less than two) of the first embodiment of the present invention. FIG. 7 shows the M×N MCS 100 obtained by forming, on a high-refractive-index waveguide substrate, M input ports $In_1$ to $In_M$ to which optical signals are input, N output ports $Out_1$ to $Out_N$ from which optical signals are output, M×N optical switch units SU 110, optical waveguides 101 optically connecting the input ports $In_1$ to $In_M$, SU 110, and output ports $Out_1$ to $Out_N$, M×N leads 115 connected to the respective optical switch units SU 110 so as to control activation/deactivation of each SU 110 by feeding each SU 110, and ground lines 117 for grounding SU 110.

SU 110 [m, n], the input port $In_m$, and the output port $Out_n$ are associated with one another such that an optical signal input to the input port $In_m$ is output to the output port $Out_n$ by activating SU 110 [m, n]. Here, m is an integer satisfying 1≤m≤M and corresponds to the first number relating to the input port, and n is an integer satisfying 1≤n≤N and corresponds to the second number relating to the output port.

As shown in FIG. 7, the M×N MCS 100 of the first embodiment includes a plurality of optical switch unit arrays (hereinafter referred to as SU arrays) 140, each of which includes a plurality of optical switch units SU 110 arrayed vertically (in parallel with the leads 115 and ground 117). The ground line 117 is arranged in parallel with each SU array 140. The ground line 117 arranged in parallel is connected to each SU 110 of each SU array 140.

Each SU 110 includes GSW that is a 1×1 switch and MSW that is a 2×1 switch provided in the subsequent stage of GSW. In each SU array 140, a plurality of gate switches GSW and a plurality of main switches MSW included in the respective optical switch units SU 110 are arrayed vertically to form a GSW array 120 and an MSW array 130. GSW and MSW included in each SU 110 are connected to the same single lead. In the M×N MCS 100 of the first embodiment, the optical switch units SU 110 are arrayed like vertical and horizontal lines on the high-refractive-index waveguide substrate and arranged in a lattice pattern. However, the positions of SU 110 may be shifted within an allowable range of layout of common electrical wiring such as leads. As shown in FIG. 7, the GSW arrays 120 and the MSW arrays 130 are alternately arrayed from the input ports to the output ports. The input ports $In_1$ to $In_M$ are connected to GSW and the output ports $Out_1$ to $Out_N$ are connected to MSW.

Figure 3:
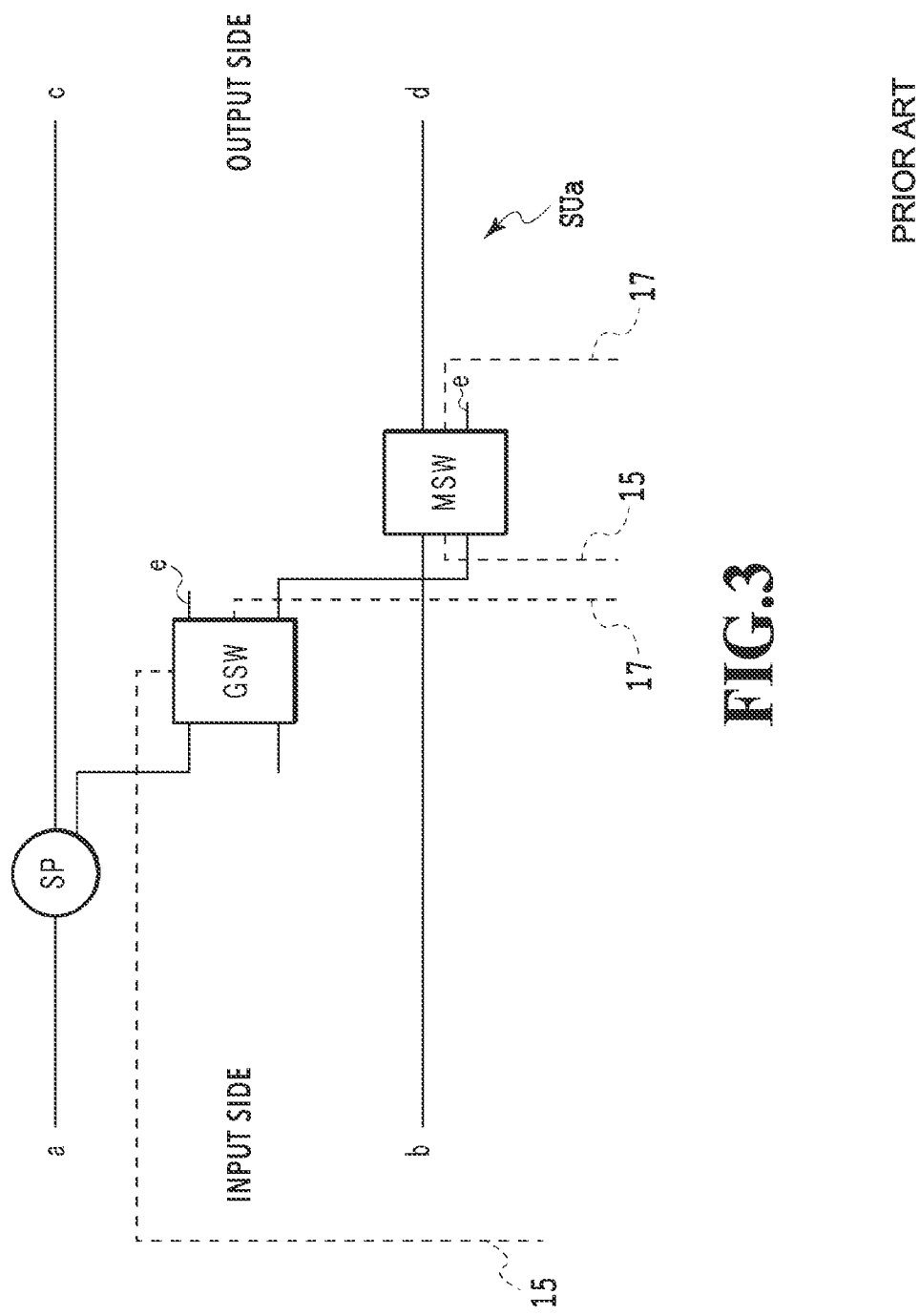
FIG. 3 is a diagram showing an example of a configuration of conventional SU.
Figure 4:
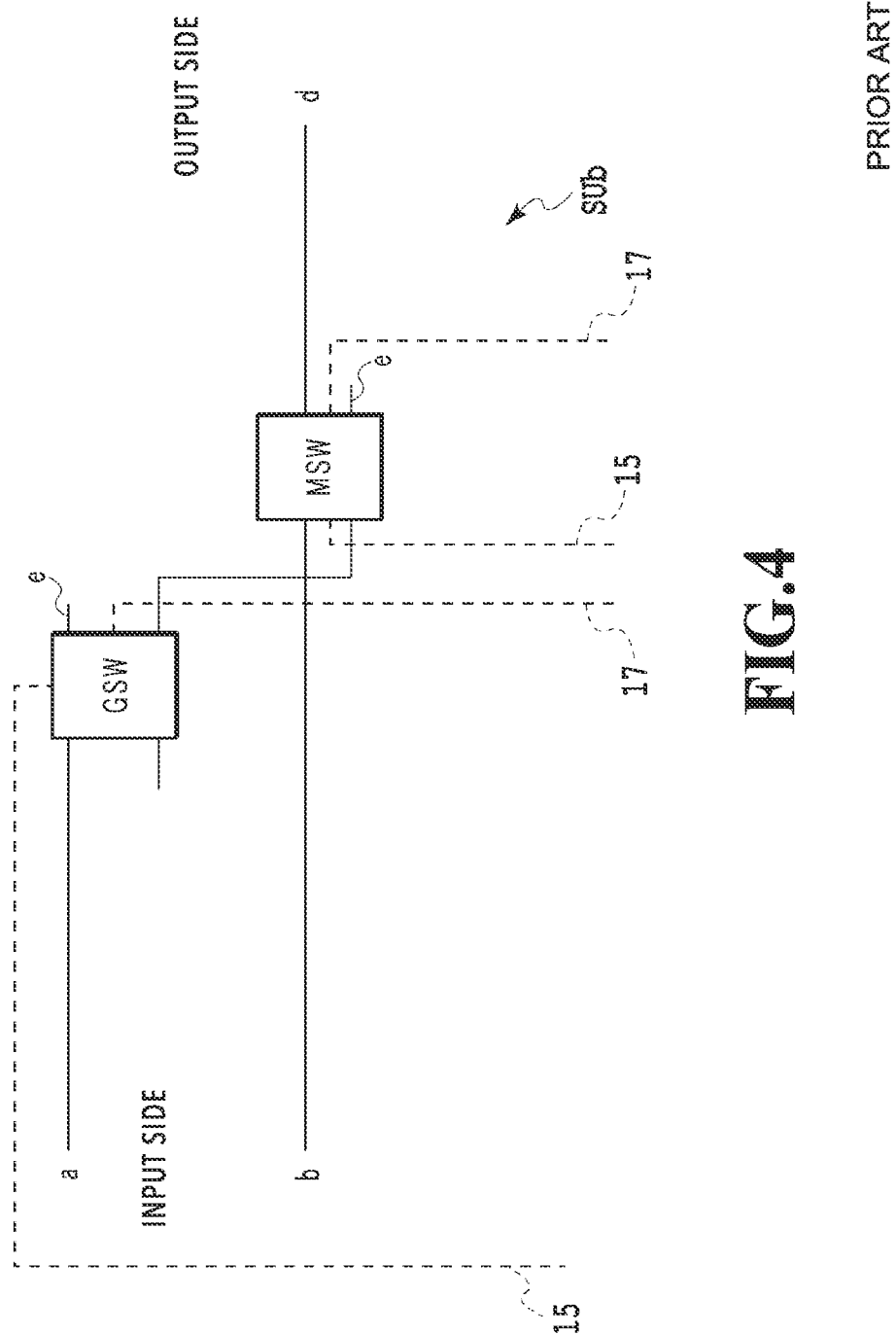
FIG. 4 is a diagram showing an example of a configuration of conventional SU.
Figure 8:
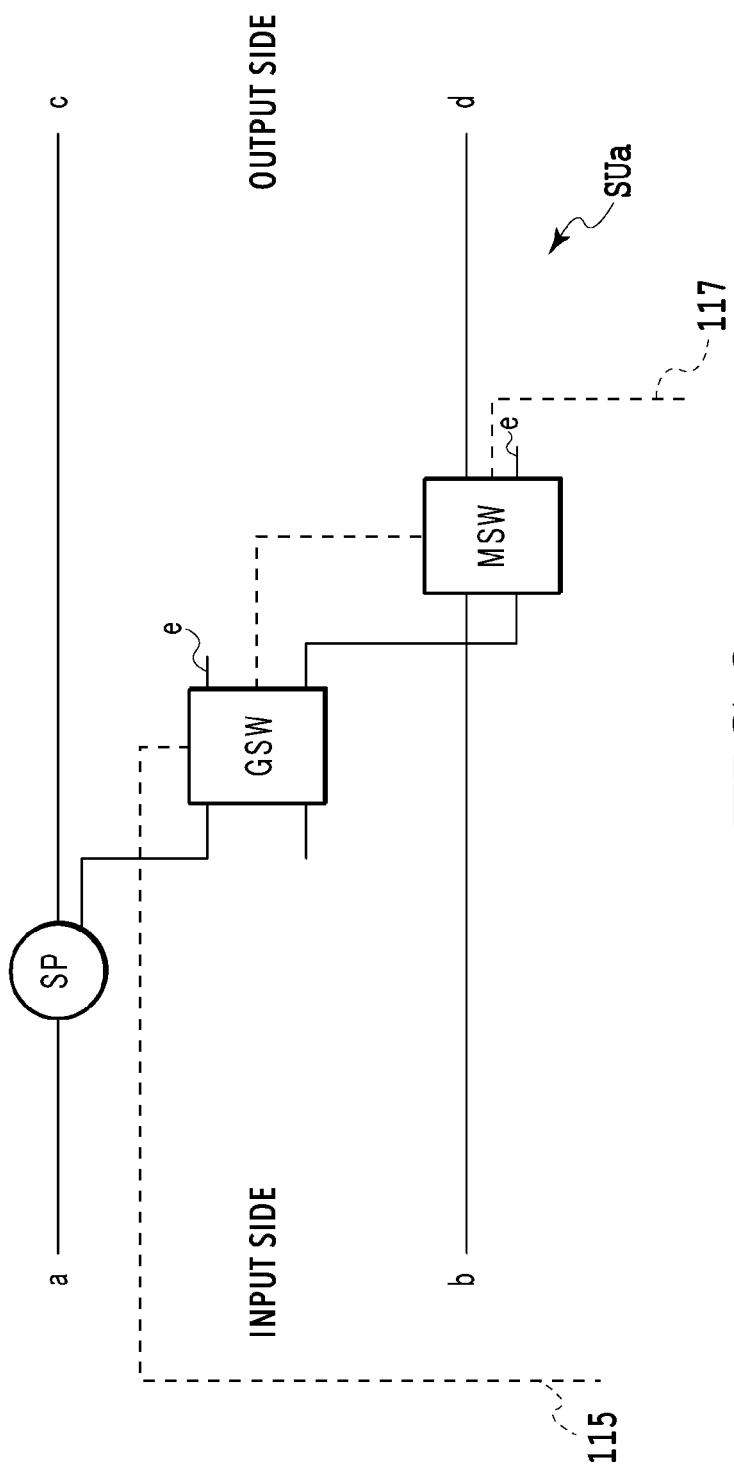
FIG. 8 is a diagram showing an example of a configuration of SU according to the first embodiment of the present invention.
Figure 9:
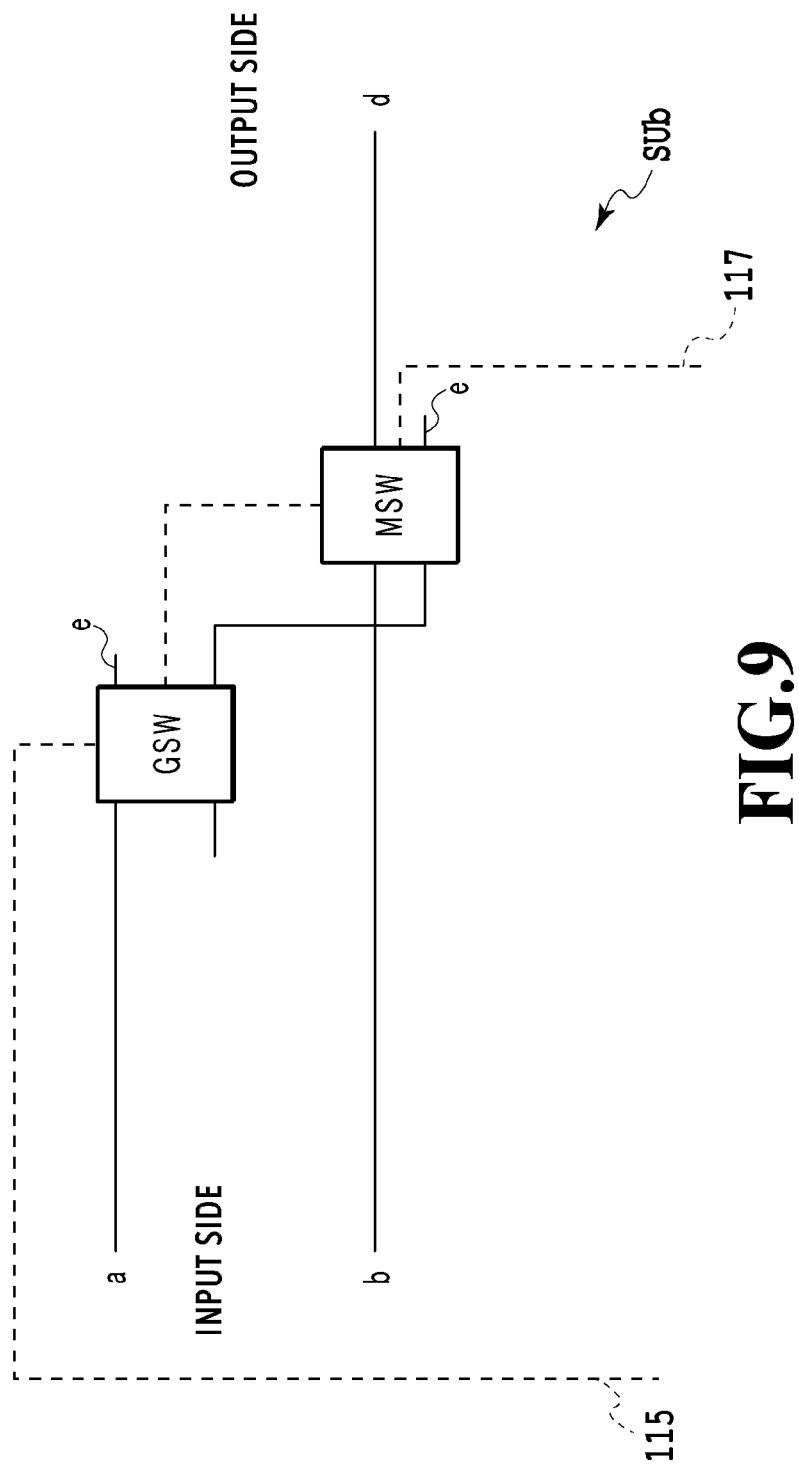
FIG. 9 is a diagram showing an example of a configuration of SU according to the first embodiment of the present invention.

FIG. 8 and FIG. 9 are diagrams showing examples of configurations of SUa and SUb, respectively, according to the first embodiment of the present invention. As shown in FIG. 8 and FIG. 9, in SUa and SUb of the first embodiment, GSW and MSW are connected in series by a common lead 115 and ground line 117 such that activation/deactivation of the switches is simultaneously controlled. Wiring of GSW and MSW is laid out so as to connect without any intersection. SUa and SUb of the first embodiment are identical to SUa and SUb shown in FIG. 3 and FIG. 4 except that they are connected by the common lead 115 and ground line 117.

In the M×N MCS 100 of the first embodiment shown in FIG. 7, among the M×N optical switch units SU, optical switch units SU connected to Out$_1$ to Out$_N$ are SUb shown in FIG. 9 and the other optical switch units SU are SUa shown in FIG. 8 (the 1×2 splitter SP connected in the preceding stage of SUs is omitted for simplification). In the embodiments described below, SUa and SUb have the same configurations as SUa and SUb shown in FIG. 8 and FIG. 9.

In the M×N MCS 100 of the first embodiment, by activating one of M×N optical switch units SU, an optical signal input to an input port associated with the first number associated with activated SU is output from an output port associated with the second number associated with activated SU. For example, by activating an optical switch unit SU associated with any number [m, n], an optical signal input to an input port In$_m$ can be output from an output port Out$_n$.

Figure 10:
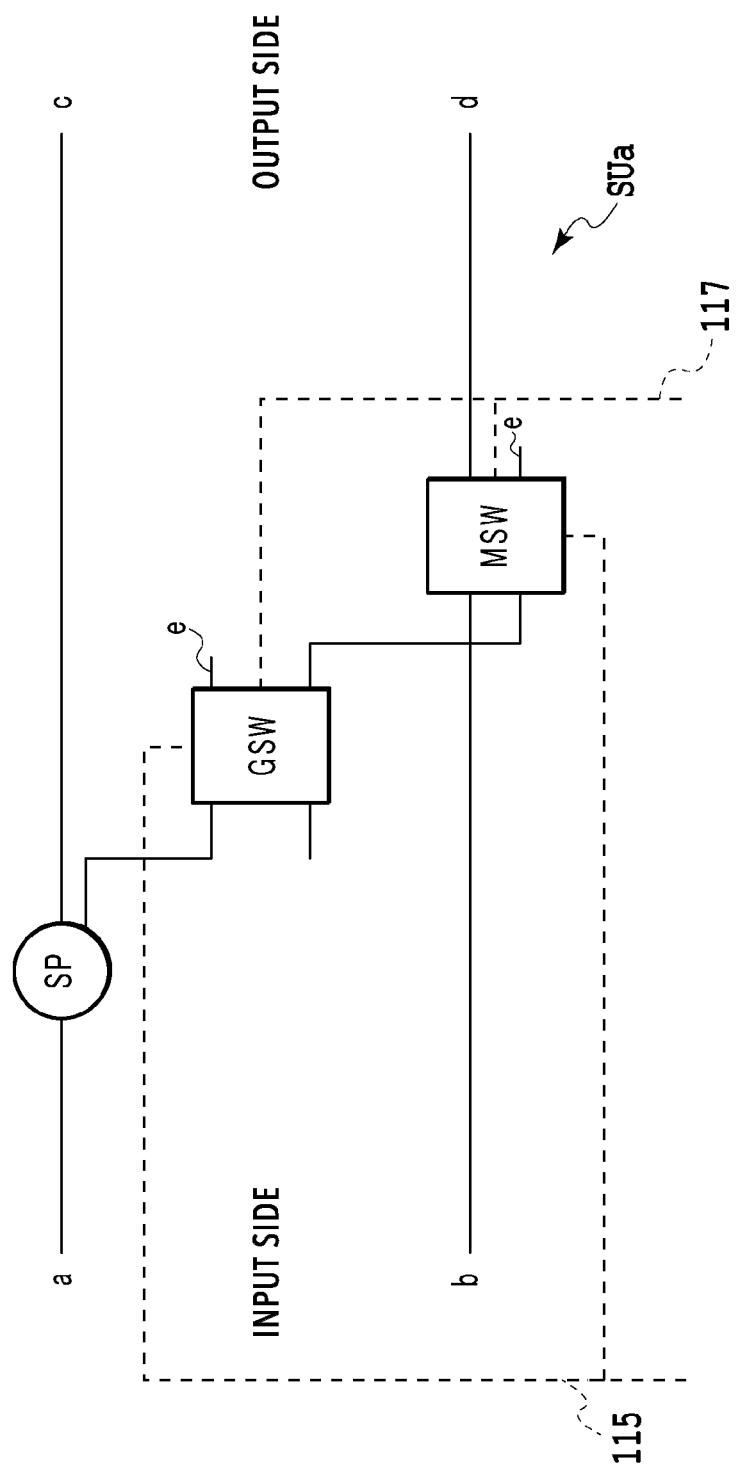
FIG. 10 is a diagram showing another example of a configuration of SU according to the first embodiment of the present invention.
Figure 11:
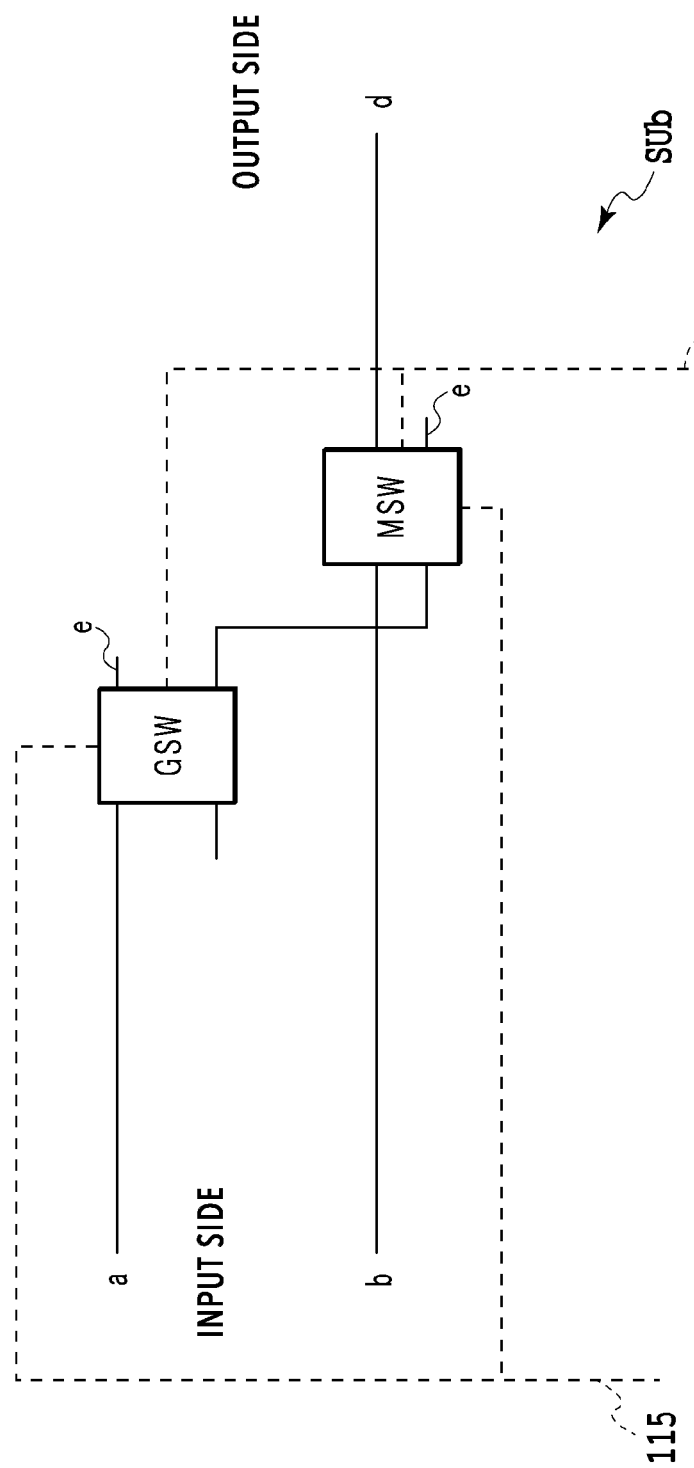
FIG. 11 is a diagram showing another example of a configuration of SU according to the first embodiment of the present invention.

FIG. 10 and FIG. 11 are diagrams showing other examples of configurations of SUa and SUb, respectively, according to the first embodiment of the present invention. As shown in FIG. 10 and FIG. 11, in SUa and SUb, GSW and MSW may be connected in parallel by the common lead 115 and ground line 117.

Figure 12:
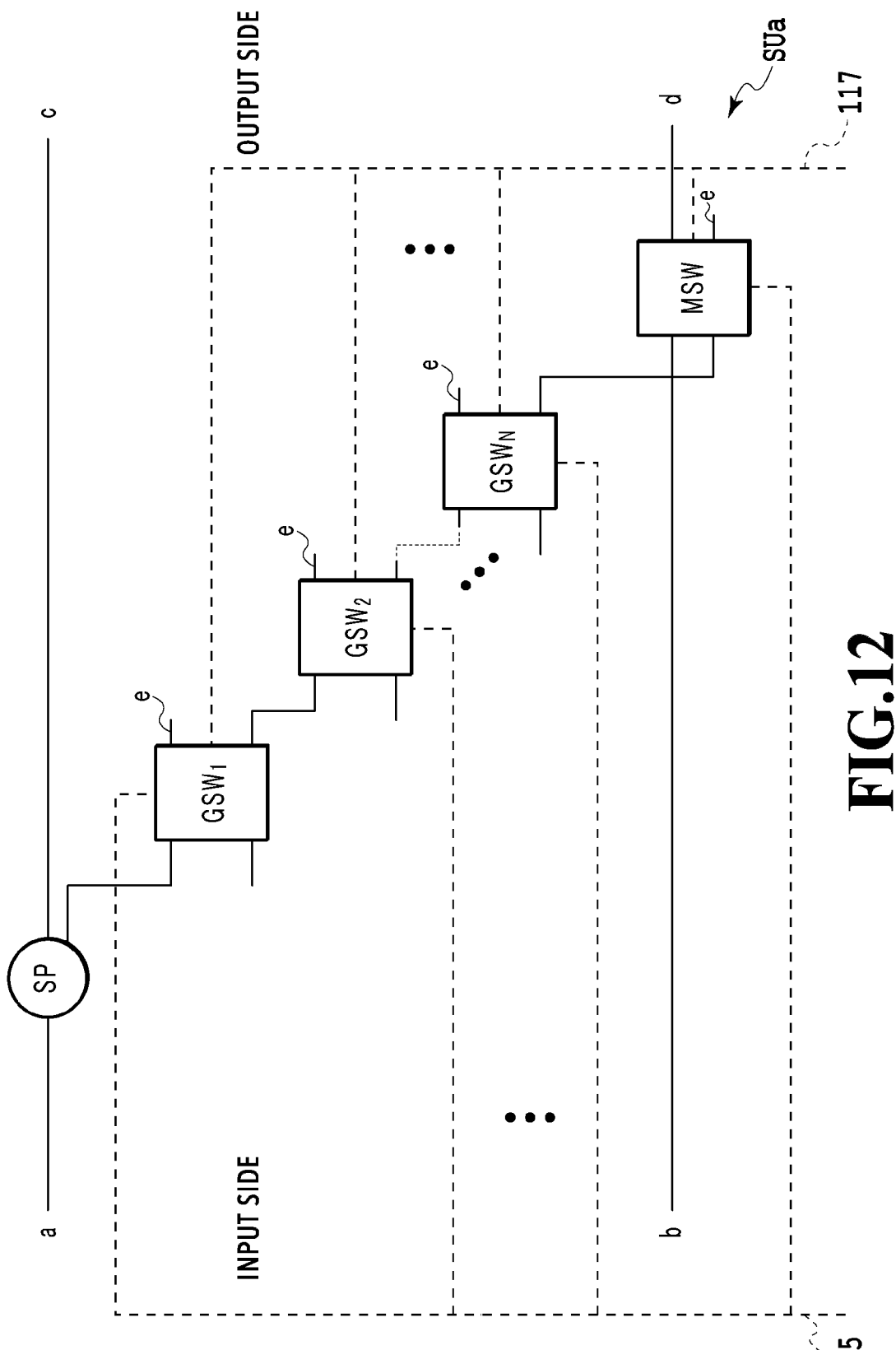
FIG. 12 is a diagram showing yet another example of a configuration of SU according to the first embodiment of the present invention.
Figure 13:
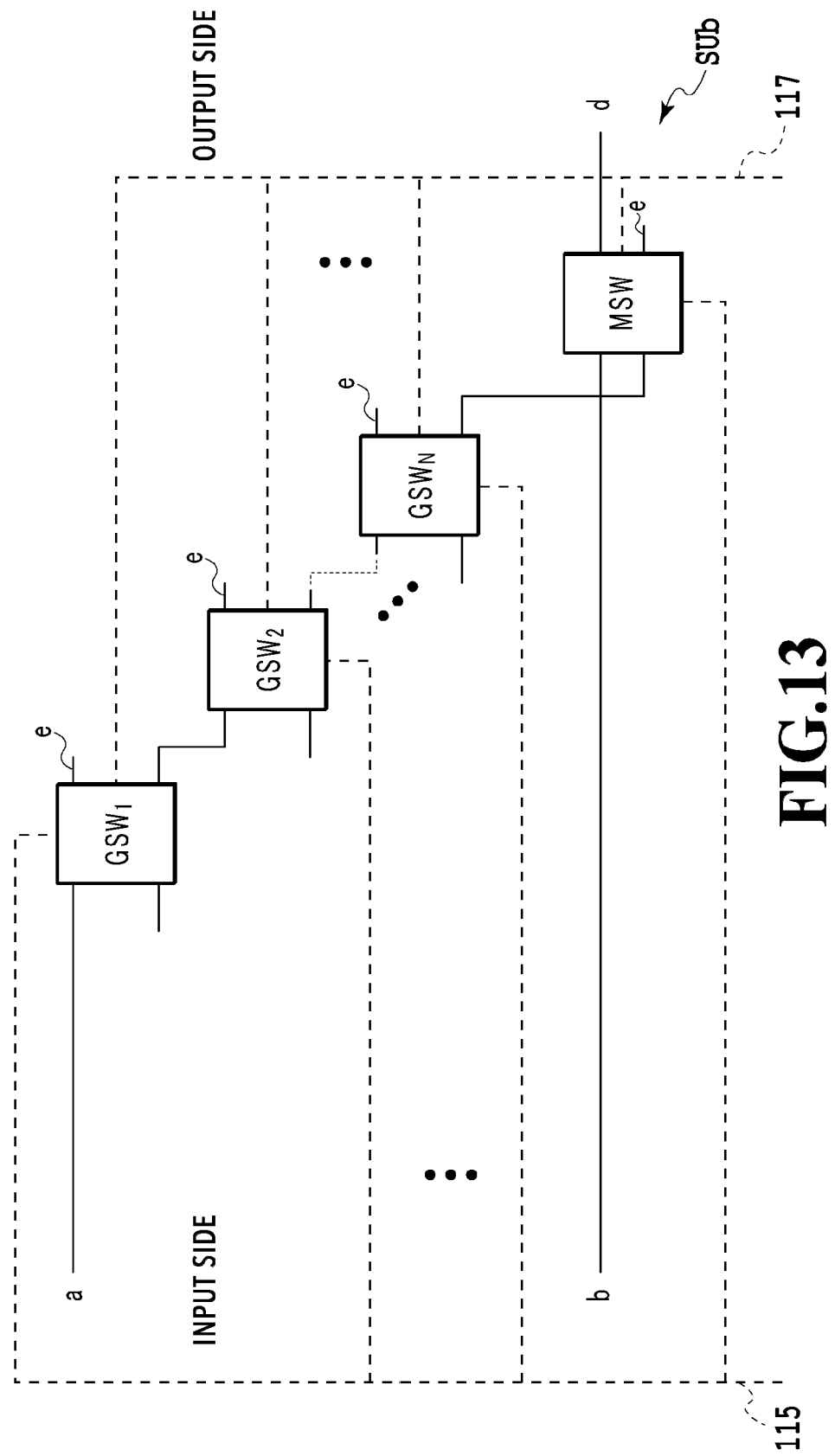
FIG. 13 is a diagram showing yet another example of a configuration of SU according to the first embodiment of the present invention.

FIG. 12 and FIG. 13 are diagrams showing yet other examples of configurations of SUa and SUb, respectively, according to the first embodiment of the present invention. FIG. 12 and FIG. 13 show SUa and SUb each comprising two or more switches GSW$_1$ to GSW$_N$. In the examples shown in FIG. 12 and FIG. 13, a plurality of gate switches GSW$_1$ to GSW$_N$ and a main switch MSW are connected in parallel by the common lead 115 and ground line 117 such that activation/deactivation of the switches is simultaneously controlled.

According to the examples shown in FIG. 12 and FIG. 13, in the case of two or more gate switches GSW, noise can be reduced since light leakage in the inactive operation of the first switch GSW$_1$ can be shut off by the subsequent switch GSW. In addition, according to the examples shown in FIG. 12 and FIG. 13, the number of wiring can be reduced by N with respect to the number N of gate switches GSW as compared with the case of increasing the number of gate switches GSW in the conventional method not using a common lead.

Figure 14:
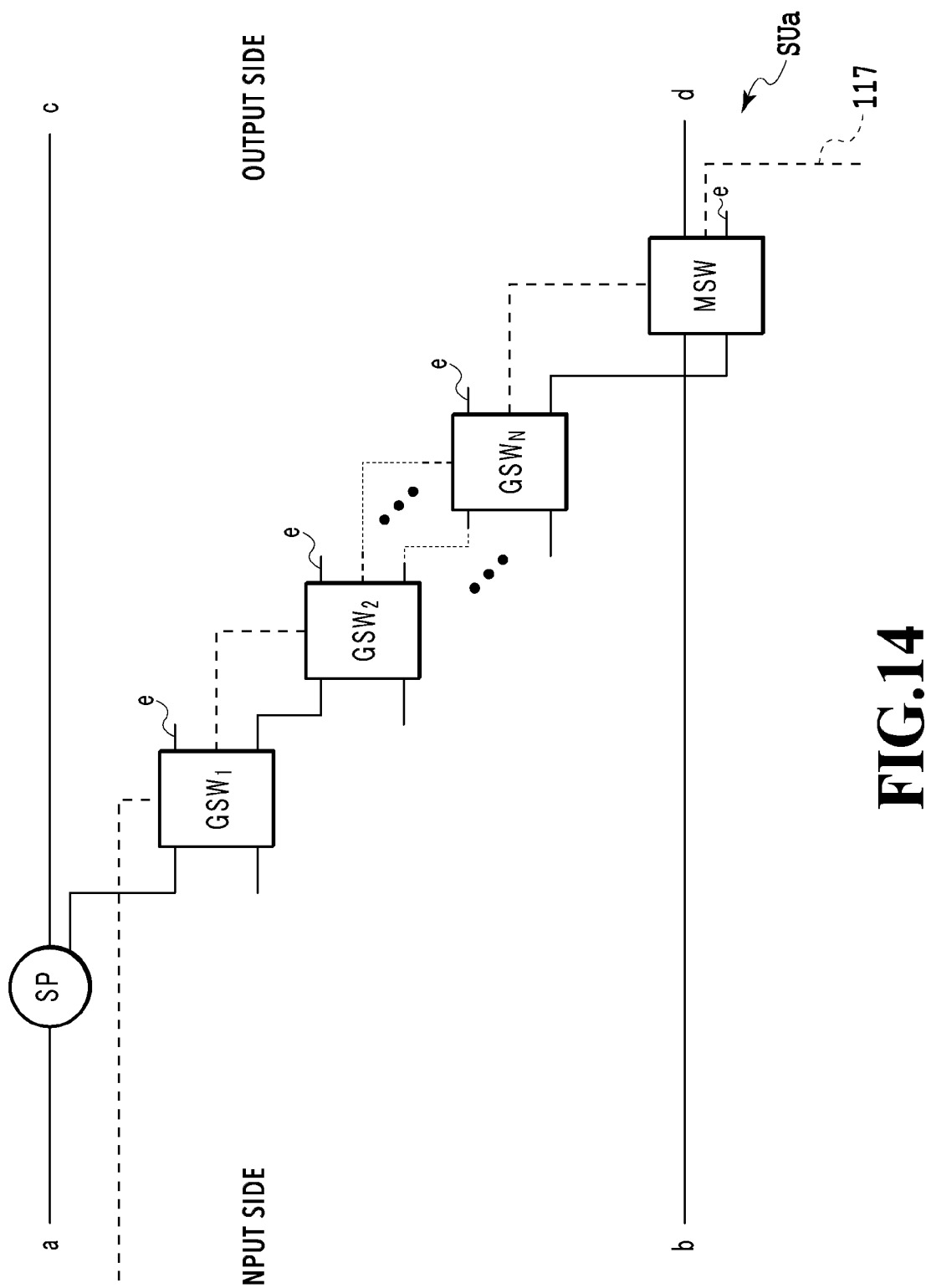
FIG. 14 is a diagram showing further another example of a configuration of SU according to the first embodiment of the present invention.
Figure 15:
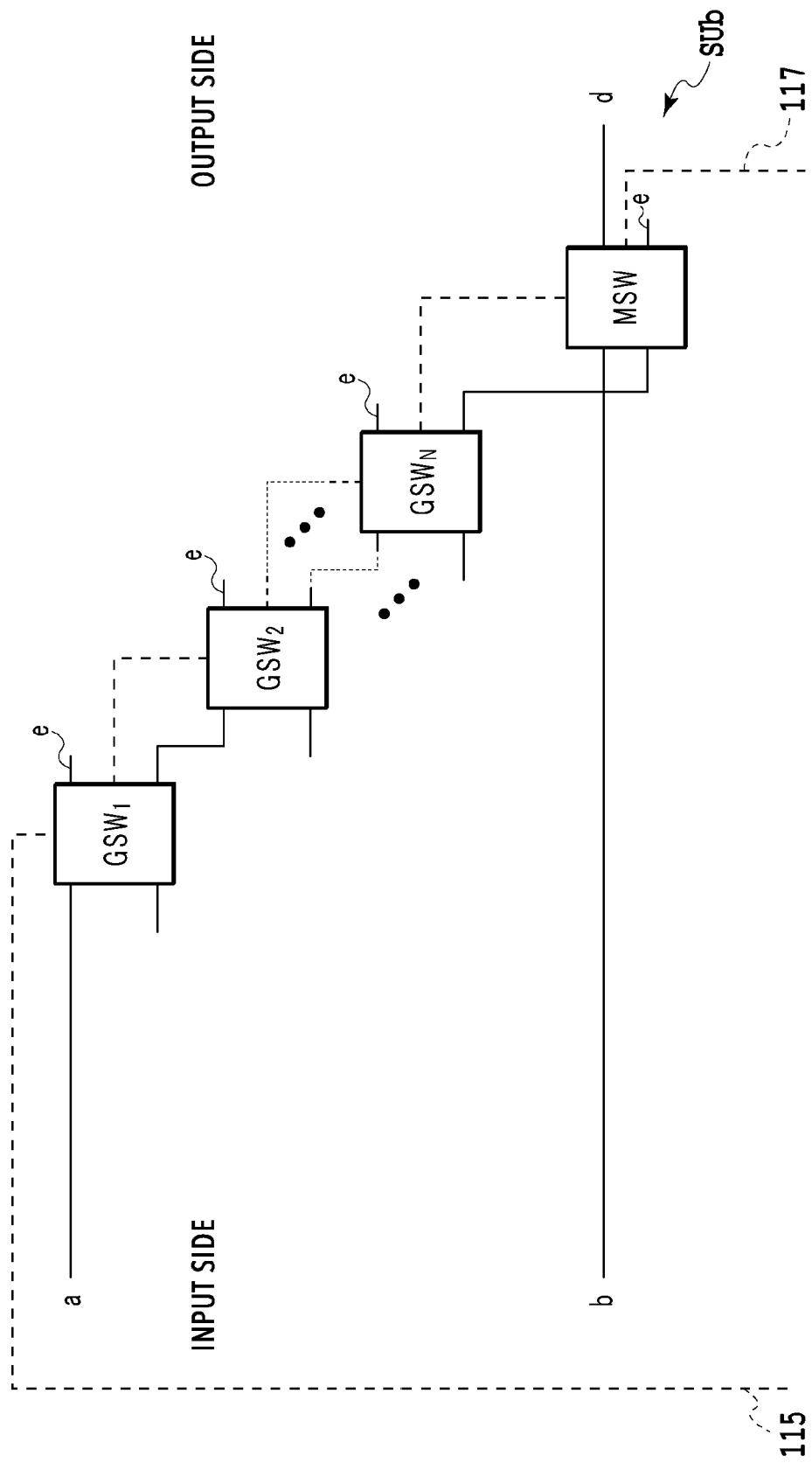
FIG. 15 is a diagram showing further another example of a configuration of SU according to the first embodiment of the present invention.

FIG. 14 and FIG. 15 are diagrams showing further other examples of configurations of SUa and SUb, respectively, according to the first embodiment of the present invention. In the examples shown in FIG. 12 and FIG. 13, a plurality of gate switches GSW$_1$ to GSW$_N$ and a main switch MSW are connected in parallel. However, the configuration is not limited to this. Like the examples shown in FIG. 14 and FIG. 15, a plurality of gate switches GSW$_1$ to GSW$_N$ and a main switch MSW may be connected in series by the common lead 115 and ground line 117.

According to the MCS of the first embodiment, downsizing of the MCS can be realized since the number of leads can be reduced by half as compared with the conventional configuration by using a common lead for GSW and MSW of each optical switch unit.

Second Embodiment

Figure 16:
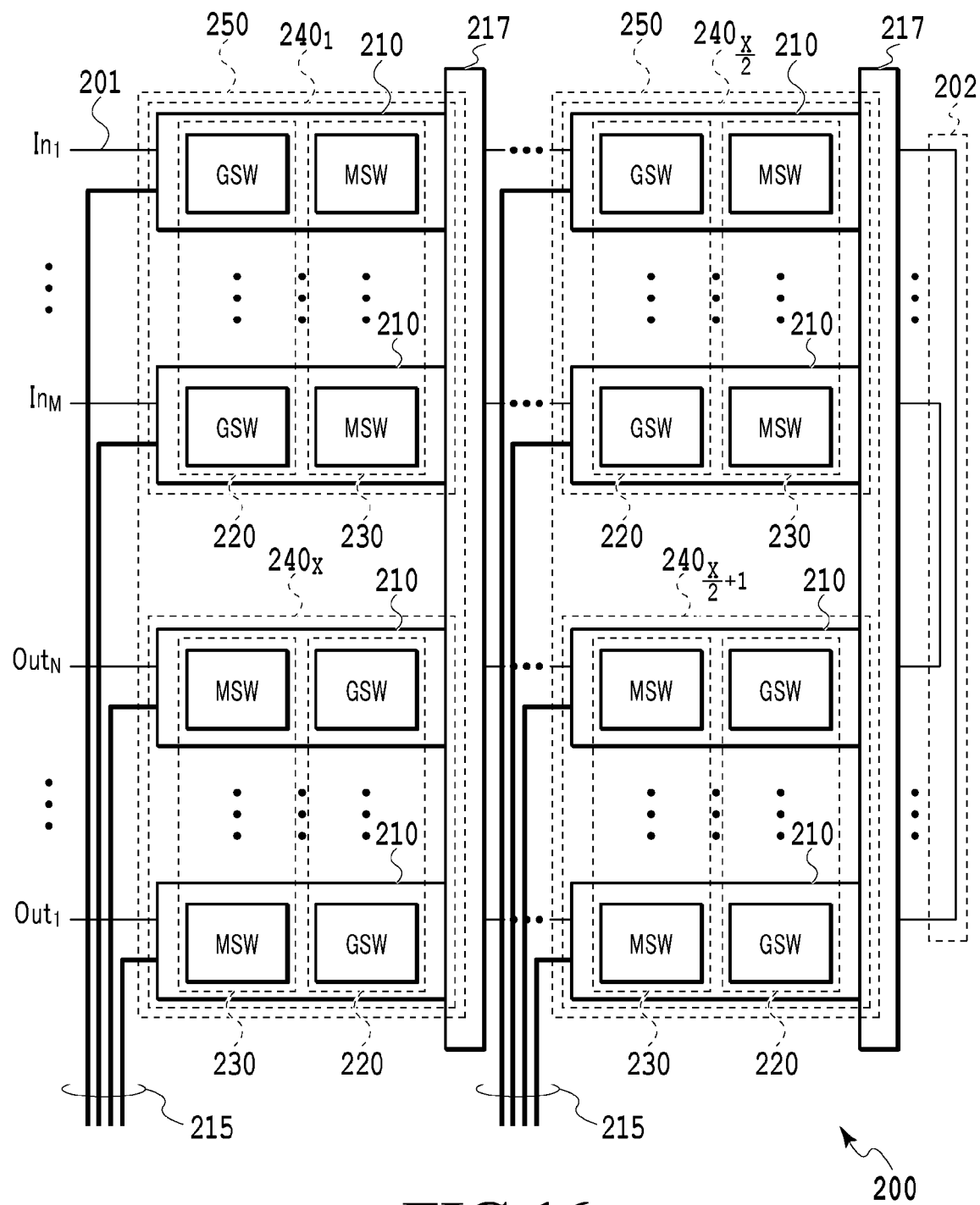
FIG. 16 is a diagram showing a simplified example of an M×N MCS according to a second embodiment of the present invention.

FIG. 16 is a diagram showing a simplified example of a configuration of an M×N MCS 200 according to the second embodiment of the present invention. FIG. 16 shows the M×N MCS 200 obtained by forming, on a high-refractive-index waveguide substrate, M input ports In$_1$ to In$_M$ to which optical signals are input, N output ports Out$_1$ to Out$_N$ from which optical signals are output, M×N optical switch units SU 210, optical waveguides 201 optically connecting the input ports In$_1$ to In$_M$, SU 210, and output ports Out$_1$ to Out$_N$, M×N leads 215 connected to the respective optical switch units SU 210 so as to control activation/deactivation of each SU 210, and ground lines 217 for grounding SU 210.

As shown in FIG. 16, the M×N MCS 200 of the second embodiment includes a plurality of SU arrays 240 constituted of SU arrays 240$_1$ to 240$_x$. Each SU array 240 is formed by vertically arraying a plurality of optical switch units SU 210.

The M×N MCS 200 of the second embodiment comprises a folded waveguide portion 202 formed by folding an optical waveguide 201 between adjacent SU arrays 240.

In the second embodiment, x, which is the number of SU arrays 240, is an even number not less than two. Further, in the M×N MCS 200 of the second embodiment, two SU arrays 240 are folded and thereby vertically arrayed to form an SU array 250. Depending on the position of the folded waveguide portion 202, the SU array 250 comprises at least M+M, M+N, or N+N optical switch units SU 210. Since it is advantageous to fold near the middle of the SU array 240 for downsizing of the MCS, it is preferable to include M+N optical switch units SU 210 in the SU array 250. In the case of folding in the middle, the number of SU arrays 250 is x/2.

Each SU 210 includes GSW and MSW provided in the subsequent stage of GSW. Each of the SU arrays 240$_1$ to 240$_x$ has a GSW array 220 and an MSW array 230. The GSW arrays 220 and the MSW arrays 230 are alternately arrayed from the input ports to the output ports. The input ports In$_1$ to In$_M$ are connected to GSW and the output ports Out$_1$ to Out$_N$ are connected to MSW.

In the M×N MCS 200 of the second embodiment, the folded waveguide portion 202 for converting an optical path 180° is provided between the x/2$^{th}$ SU array 240$_{x/2}$ and the (x/2)+1$^{th}$ SU array 240$_{(x/2)+1}$. Half of the SU arrays 240$_1$ to 240$_x$ are thus folded, whereby the input ports In$_1$ to In$_M$ and the output ports Out$_1$ to Out$_N$ are arranged on the same side. The folded waveguide portion 202 can be configured to convert an optical path 180° by, for example, providing the waveguide with two bent waveguide portions for 90° optical path conversion having an arbitrary bend radius.

Here, on the assumption that k is an integer satisfying 1≤k≤x/2, as shown in FIG. 16, the output port side is folded, whereby the input port side SU array 240$_1$ and the output port side SU array 240$_x$, the input port side SU array 2402 and the output port side SU array 240$_{x-1}$, ..., the input port side SU array 240$k$ and the output port side SU array 240$_{x-k+1}$, ..., and the input port side SU array 240$_{x/2}$ and the output port side SU array 240$_{(x/2)+1}$ are further vertically arrayed to form SU arrays 250. Two SU arrays 240 are vertically arrayed to form an SU array 250. A single common ground line 217 is connected to each SU 210 in each SU array 250.

In the M×N MCS 200 of the second embodiment, in addition to using the common leads 215, the optical waveguide 201 is folded at the center of the SU arrays 240$_1$ to 240$_x$, and the single common ground line 217 is used for each SU array 250. Therefore, according to the M×N MCS 200 of the second embodiment, the number of leads can be reduced by half as compared with the conventional technique by using the common leads 215. Furthermore, the length of the SU arrays 240 in the array direction between the input and output ports is reduced from x to x/2 by the folding structure, that is, the length in the array direction can be reduced by about half. Moreover, the number of ground lines can be reduced by using the common ground line 217 for an input port side SU array and an output port side SU array. As a result, further downsizing of the MCS can be realized.

Here, although the number of SU arrays 240 is an even number in the second embodiment, the folding structure of the second embodiment is also applicable to the case where the number of SU arrays 240 is an odd number. In this case, on the assumption that the number of SU arrays 240 is y (y is an odd number), it is preferable to provide the folded waveguide portion 202 in an optical waveguide between the $(y\pm1)/2^{th}$ SU array 240 and the $\{(y\pm1)/2\}+1^{th}$ SU array 240.

Further, although the second embodiment shows the folding structure in which the folded waveguide portion 202 is provided between the $x/2^{th}$ SU array $240_{x/2}$ and the $(x/2)+1^{th}$ SU array $240_{(x/2)+1}$, the folding structure is not limited to this and the folded waveguide portion 202 may be provided between any SU arrays 240. Furthermore, at least one pair of an input port side SU array 240 before being folded by the folding structure and an output port side SU array 240 after being folded by the folding structure forms an SU array 250, and the common ground line 217 can be used in each SU 210 in the SU array 250. This can bring about the advantageous effects of this embodiment, that is, a reduction in length of the SU arrays 240 in the array direction and a reduction in number of ground lines.

Third Embodiment

Figure 17:
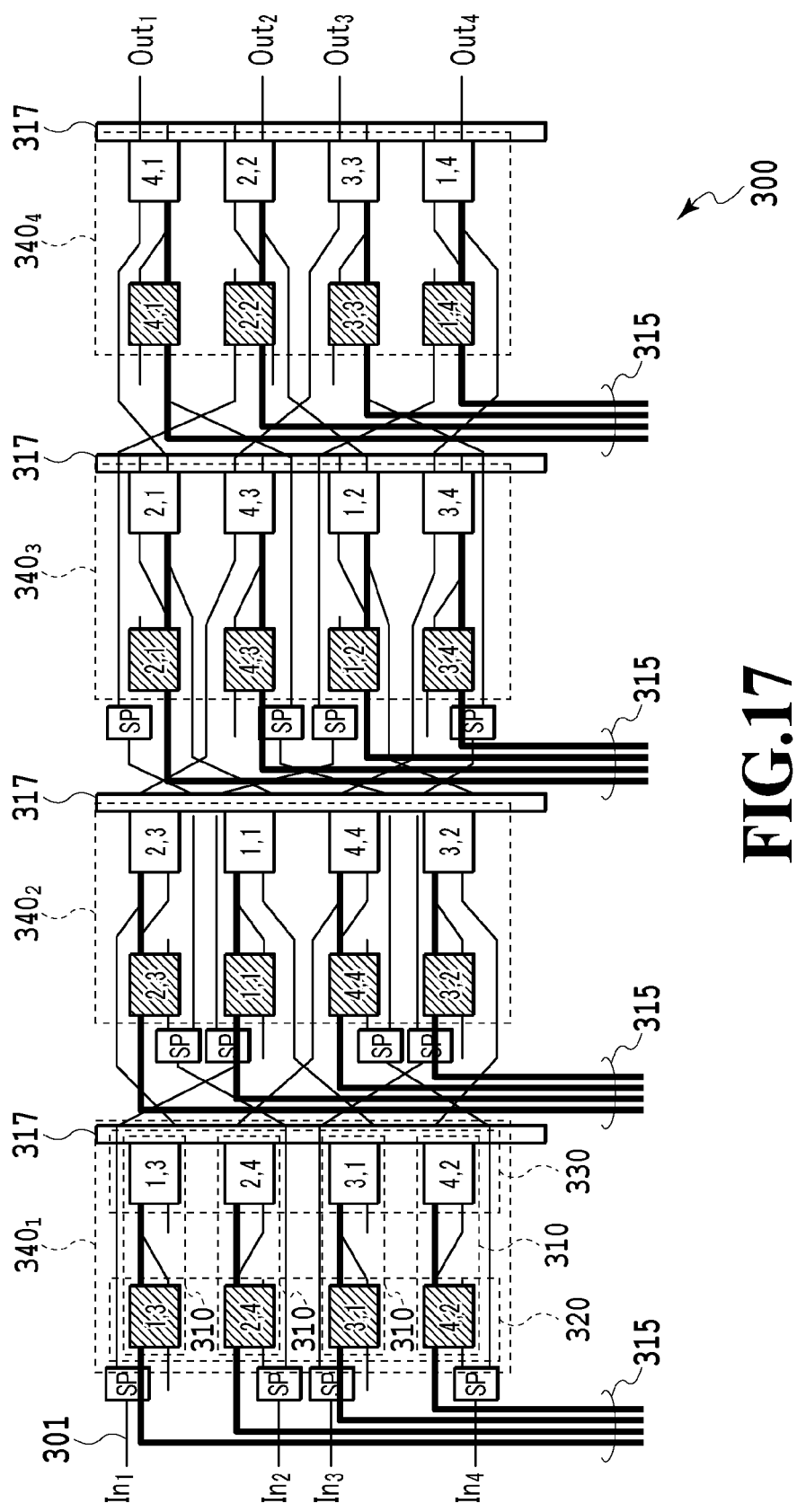
FIG. 17 is a diagram showing an example of a configuration of a 4×4 MCS according to a third embodiment of the present invention.

FIG. 17 is a diagram showing a configuration of a 4×4 MCS according to the third embodiment of the present invention. FIG. 17 shows a 4×4 MCS 300 obtained by forming, on a high-refractive-index waveguide substrate, four input ports $In_1$ to $In_4$, four output ports $Out_1$ to $Out_4$, 16 optical switch units SU 310, optical waveguides 301 optically connecting the input ports $In_1$ to $In_4$, SU 310, and output ports $Out_1$ to $Out_4$, 16 leads 315 connected to the respective optical switch units SU 310, and four ground lines 317.

As shown in FIG. 17, the 4×4 MCS 300 of the third embodiment includes four SU arrays 3401 to 3404 each including four vertically arrayed optical switch units SU 310. Each SU 310 includes GSW and MSW provided in the subsequent stage of GSW. Each of the SU arrays 3401 to 3404 has a GSW array 320 and an MSW array 330. The GSW arrays 320 and the MSW arrays 330 are alternately arrayed from the input ports to the output ports. The input ports $In_1$ to $In_4$ are connected to GSW and the output ports $Out_1$ to $Out_4$ are connected to MSW. A common lead 315 is connected to GSW and MSW of each SU 310.

Each SU 310 in the first to third SU arrays 3401 to 3403 is equipped with a 1×2 splitter SP in the preceding stage of GSW. The 1×2 splitter SP is an asymmetrical splitter and a splitting ratio is sequentially set at 3:1, 2:1, and 1:1 in the order of the first SU array 3401, the second array, and the third SU array 3403.

Figure 18:
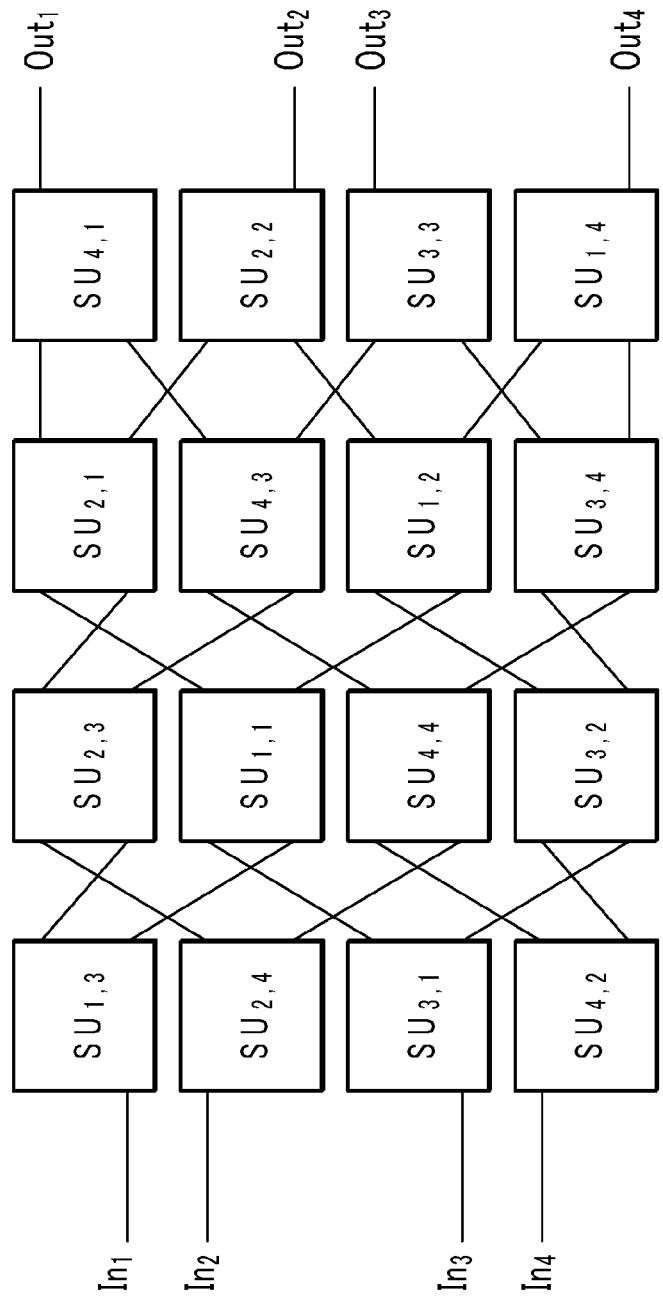
FIG. 18 is a diagram showing a simplified example of a configuration of a 4×4 MCS according to the third embodiment of the present invention.

FIG. 18 is a diagram showing a simplified example of a configuration of a 4×4 MCS 300 according to the third embodiment of the present embodiment. FIG. 18 shows 16 optical switch units $SU_{1,1}$ to $SU_{4,4}$. In the 4×4 MCS 300 of the third embodiment, $SU_{4,1}$, $SU_{2,2}$, $SU_{3,3}$, and $SU_{1,4}$ connected to the respective output ports $Out_1$ to $Out_4$ are SUb and the other optical switch units are SUa.

In the 4×4 MCS 300 of the third embodiment, for example, an optical signal from the input port $In_2$ can be output to the output port $Out_3$ by applying voltage to $SU_{2,3}$. At this time, the optical signal from the input port $In_2$ passes through $SU_{2,4}$ in the bar state, active $SU_{2,3}$ in the cross state, and $SU_{4,3}$ and $SU_{3,3}$ in the bar state, and is then output from the output port $Out_3$.

Figure 1:
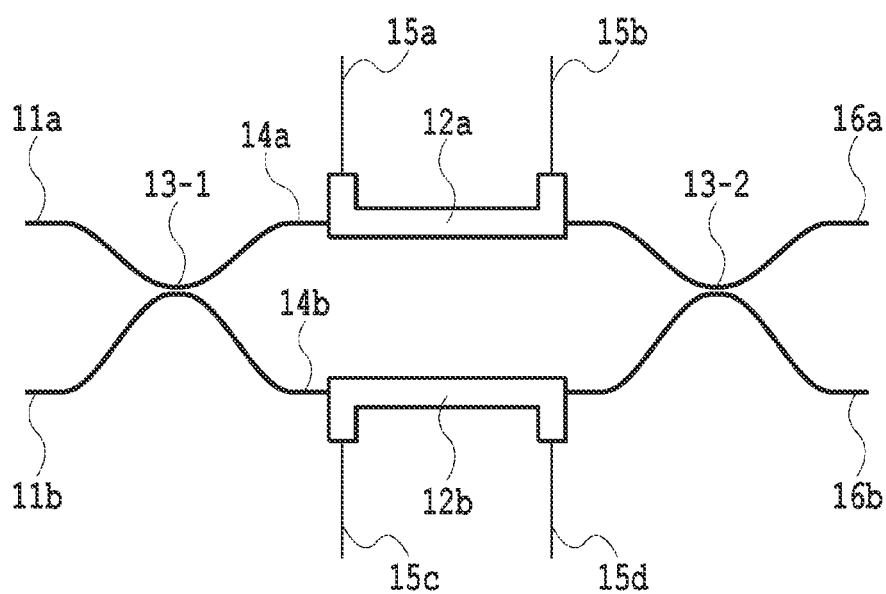
FIG. 1 is a diagram showing an example of a conventional MZI optical switch.
Figure 2:
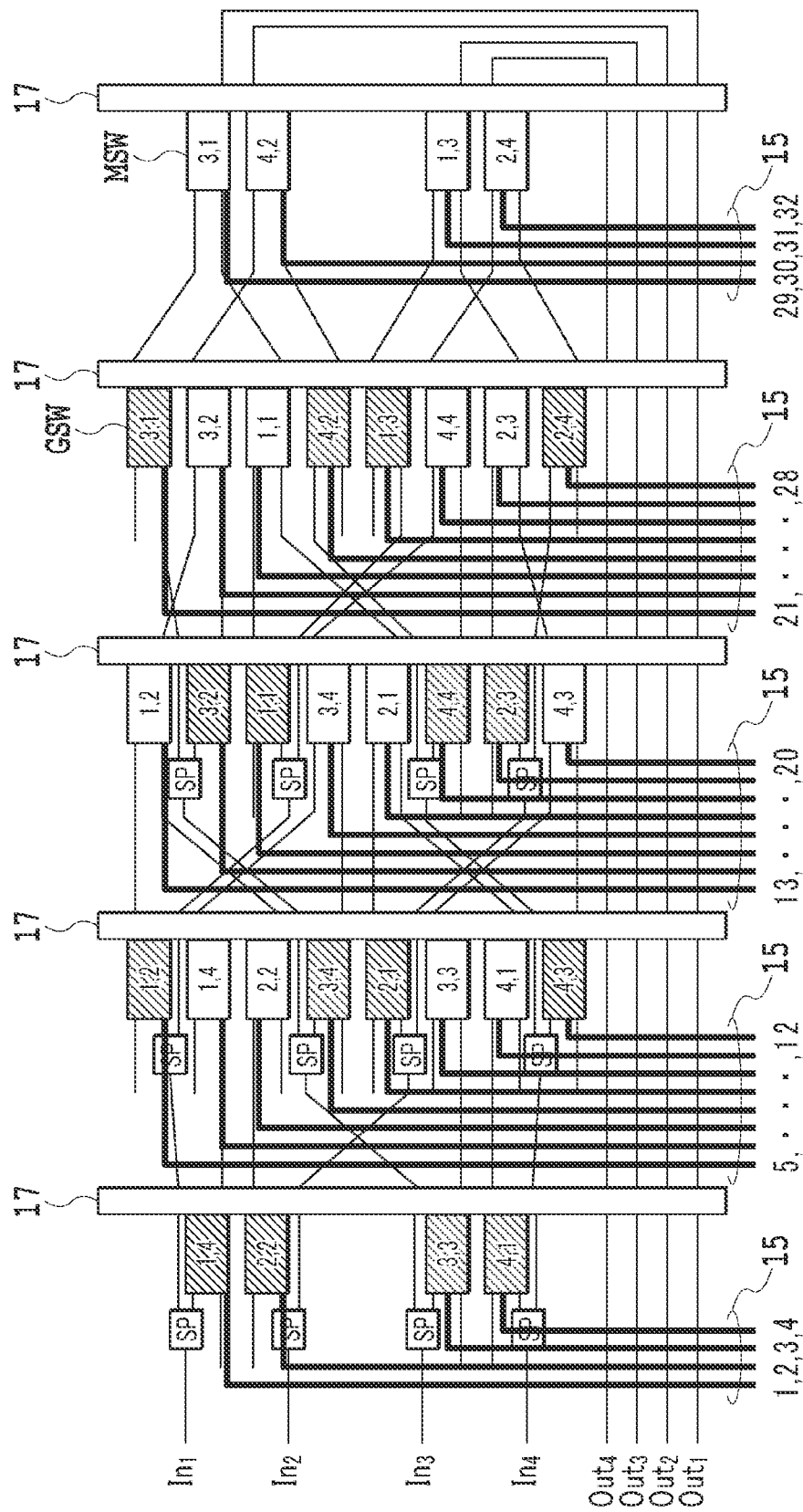
FIG. 2 is a diagram showing an example of an MCS using conventional 4×4 MZI optical switches.

According to the 4×4 MCS 300 of the third embodiment, the number of leads can be reduced by half as compared with the configuration of the conventional 4×4 MCS shown in FIG. 2. Therefore, the footprint of leads can be reduced and downsizing of the MCS can be realized.

Fourth Embodiment

Figure 19:
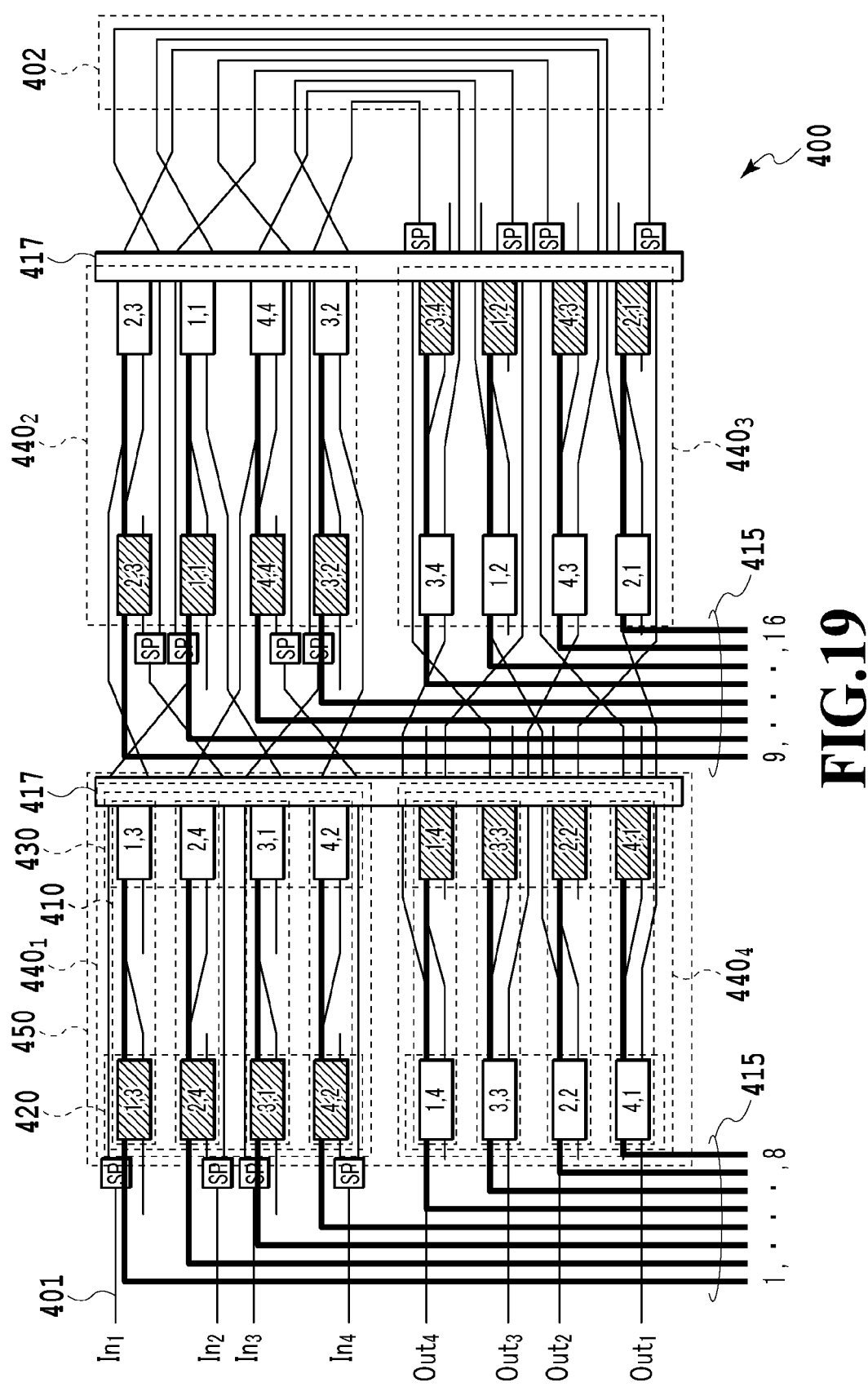
FIG. 19 is a diagram showing an example of a 4×4 MCS according to a fourth embodiment of the present invention.

FIG. 19 is a diagram showing a configuration of a 4×4 MCS according to the fourth embodiment of the present invention. FIG. 19 shows a 4×4 MCS 400 obtained by forming, on a high-refractive-index waveguide substrate, four input ports $In_1$ to $In_4$, four output ports $Out_1$ to $Out_4$, 16 optical switch units SU 410, optical waveguides 401 optically connecting the input ports $In_1$ to $In_4$, SU 410, and output ports $Out_1$ to $Out_4$, 16 leads 415 connected to the respective optical switch units SU 410, and two ground lines 417.

As shown in FIG. 19, the 4×4 MCS 400 of the fourth embodiment includes four SU arrays $440_1$ to $440_4$, each SU array 440 including four optical switch units SU 410. The SU arrays $440_1$ to $440_4$ have a folded waveguide portion 402 in an optical waveguide 401 between the SU arrays $440_2$ and $440_3$ to form a U-shaped array. Since the 4×4 MCS 400 of the fourth embodiment has the folded waveguide portion 402 between the SU arrays $440_2$ and $440_3$, which correspond to the center of the SU arrays $440_1$ to $440_4$, two SU arrays 440 are vertically arrayed, with the result that two SU arrays 450 are formed.

Each SU 410 includes GSW and MSW provided in the subsequent stage of GSW. Each of the SU arrays $440_1$ to $440_4$ has a GSW array 420 and an MSW array 430. The GSW arrays 420 and the MSW arrays 430 are alternately arrayed from the input ports to the output ports. The input ports $In_1$ to $In_4$ are connected to GSW and the output ports $Out_1$ to $Out_4$ are connected to MSW.

Further, each SU 410 in the SU arrays $440_1$ to $440_3$ is equipped with a 1×2 splitter SP in the preceding stage of GSW. The 1×2 splitter SP is an asymmetrical splitter and a splitting ratio is sequentially set at 3:1, 2:1, and 1:1 in the order of the first SU array $440_1$, the SU array $440_2$, and the SU array $440_3$.

In the 4×4 MCS 400 of the fourth embodiment, the folded waveguide portion 402 is provided in an optical waveguide 401 connecting the SU array $440_2$ and SU array $440_3$. The optical waveguide 401 is thus folded between the second SU array $440_2$ and the third SU array $440_3$, whereby the input ports $In_1$ to $In_4$ and the output ports $Out_1$ to $Out_4$ are arranged on the same side.

As shown in FIG. 19, the input port side SU array $440_1$ and the output port side SU array $440_4$, and the input port side SU array $440_2$ and the output port side SU array $440_3$ are vertically arrayed by introducing the folded waveguide portion 402 to form SU arrays 450. Eight optical switch units SU 410 included in each SU array 450 is connected by a single common ground line 417.

As described above, in the 4×4 MCS 400 of the fourth embodiment, in addition to using the common leads 415, the optical waveguide 401 is folded between the SU array $440_2$ and the SU array $440_3$, which correspond to the center of the SU arrays $440_1$ to $440_4$, and the single common ground line 417 is used for each SU array 450. Therefore, according to the 4×4 MCS 400 of the fourth embodiment, the number of leads can be reduced by half as compared with the conventional technique by using the common leads 415 and the length of the SU arrays 440 in the array direction between the input and output ports can be reduced by the folding structure. Further, the number of ground lines can be reduced by using the common ground lines 417 for the SU array $440_1$ and the SU array $440_4$ and for the SU array $440_2$ and the SU array $440_3$. As a result, further downsizing of the MCS can be realized.

Fifth Embodiment

Figure 20:
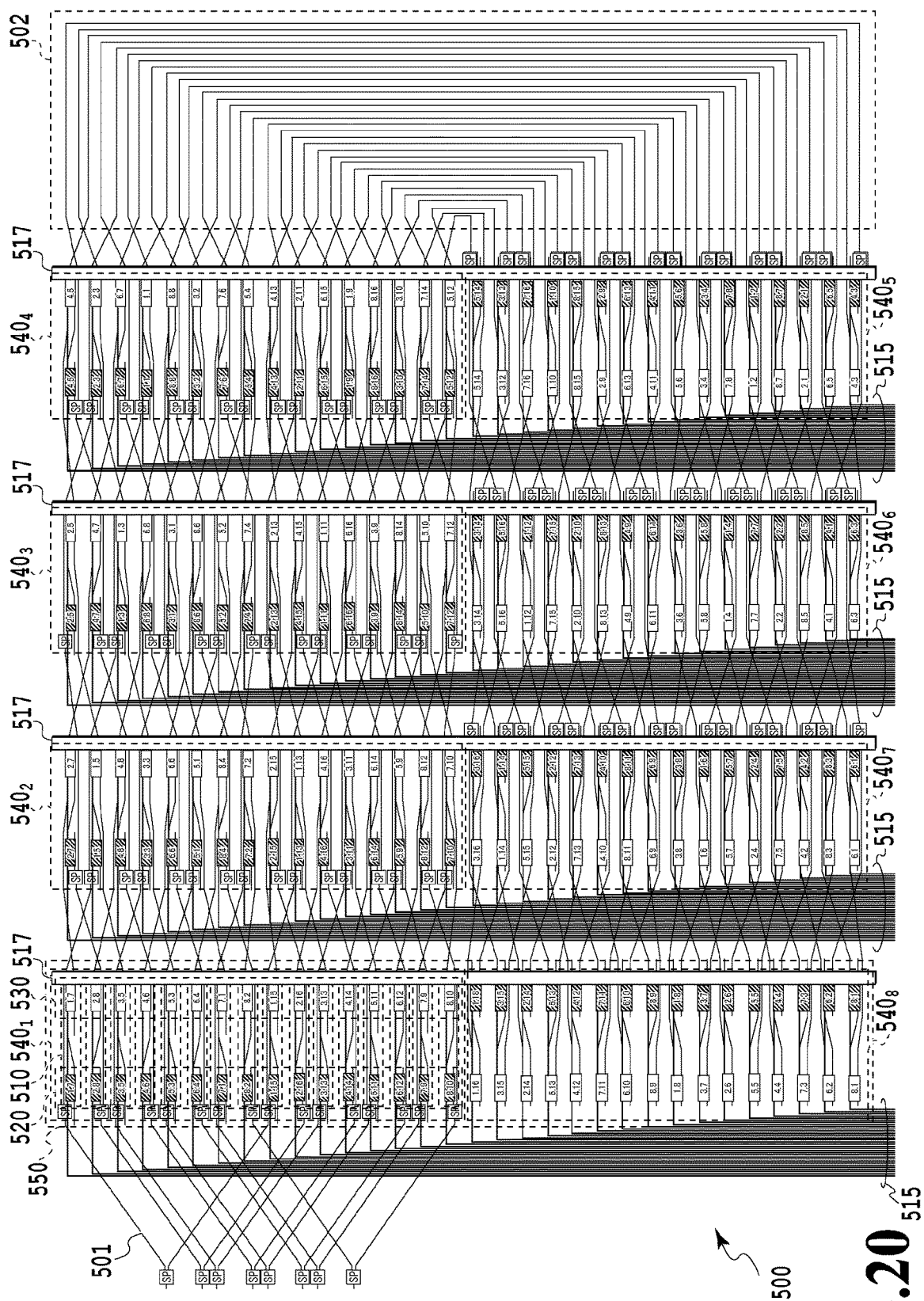
FIG. 20 is a diagram showing an example of a configuration of an 8×16 MCS according to a fifth embodiment of the present invention.

FIG. 20 shows a configuration of an 8×16 MCS according to the fifth embodiment of the present invention. FIG. 20 shows an 8×16 MCS 500 obtained by forming, on a high-refractive-index waveguide substrate, eight input ports $In_1$ to $In_8$, 16 output ports $Out_1$ to $Out_{16}$, 128 optical switch units SU 510, optical waveguides 501 optically connecting the input ports $In_1$ to $In_8$, SU 510, and output ports $Out_1$ to $Out_{16}$, 128 leads 515 connected to the respective optical switch units SU 510, and four ground lines 517.

As shown in FIG. 20, the 8×16 MCS 500 of the fifth embodiment includes eight SU arrays $540_1$ to $540_8$ each including the same number of vertically arrayed optical switch units SU 510. The SU arrays $540_1$ to $540_8$ form a U-shaped array by folding the optical waveguide 501 between the SU arrays by a folded waveguide portion 502. In addition, the 8×16 MCS 500 of the fifth embodiment has four SU arrays 550 each including two SU arrays 540 vertically arrayed by introducing the folded waveguide portion.

Each SU 510 includes GSW and MSW provided in the subsequent stage of GSW. Each of the SU arrays $540_1$ to $540_8$ has a GSW array 520 and an MSW array 530.

As shown in FIG. 20, in the 8×16 MCS 500 of the fifth embodiment, the folded waveguide portion 502 is provided in the optical waveguide 501 connecting the SU array $540_4$ and the SU array $540_5$ from the input port side. This is because an optimum way for downsizing is to provide the folded waveguide portion 502 in a portion corresponding to the center of the SU arrays $540_1$ to $540_8$. The optical waveguide 501 is thus folded between the SU array $540_4$ and the SU array $540_5$, whereby the input ports $In_1$ to $In_8$ and the output ports $Out_1$ to $Out_{16}$ are arranged on the same side.

In the fifth embodiment, since the number of inputs is 8 and the number of outputs is 16, it is necessary to branch input light. Thus, 1×2 splitters SP in which a splitting ratio is set at 1:1 are provided between the input ports $In_1$ to $In_8$ and the respective optical switch units SU 510 included in the SU array $540_1$. The 1×2 splitter SP in each SU is an asymmetrical splitter and a splitting ratio is sequentially set at 7:1, 6:1, 5:1, 4:1, 3:1, 2:1, and 1:1 from the SU array $540_1$ to the SU array $540_7$.

As shown in FIG. 20, even in the case of the 8×16 MCS, the principle of the present invention is applicable and an 8×16 MCS smaller than a conventional 8×16 MCS can be realized.

INDUSTRIAL APPLICABILITY

The present invention is usable in an optical communications system.

The invention claimed is:

1. A multicast switch formed on a high-refractive-index waveguide substrate, comprising:
M input ports to which optical signals are input, the input ports being associated with different numbers out of first numbers 1, . . . , M;
N output ports from which the optical signals are output, the output ports being associated with different numbers out of second numbers 1, . . . , N;
M×N optical switch units associated with different pairs of numbers [m, n], where m is an integer satisfying 1≤m≤M and corresponds to the first numbers and n is an integer satisfying 1≤n≤N and corresponds to the second number;
optical waveguides optically connecting the M input ports, the M×N optical switch units, and the N output ports; and
leads connected to the M×N optical switch units, respectively, to control activation/deactivation of the optical switch units,
wherein by activating one optical switch unit of the M×N optical switch units, an optical signal input to the input port associated with the first number associated with the activated optical switch unit is output from the output port associated with the second number associated with the activated optical switch unit,
the M×N optical switch units include at least a gate switch that is a 1×1 switch and a main switch that is a 2×1 switch provided in a subsequent stage of the gate switch, and
in each of the optical switch units, the gate switch and the main switch are connected to a common lead,
wherein an optical switch unit array is formed by the plurality of optical switch units arrayed in parallel with the leads,
the multicast switch further comprises a ground line arranged in parallel with each of a plurality of optical switch unit arrays, and
each of a plurality of ground lines is connected to each optical switch unit in the optical switch unit array in parallel with the ground line.

2. The multicast switch according to claim 1, wherein a plurality of optical switch units of the M×N optical switch units are arrayed at least linearly.

3. The multicast switch according to claim 2, wherein the plurality of optical switch units are arrayed in a lattice pattern.

4. The multicast switch according to claim 2, wherein the optical switch units include a first optical switch unit comprising a 1×2 splitter in a preceding stage and a second optical switch unit not comprising the 1×2 splitter, and
optical switch units connected to the output ports are the second optical switch units.

5. The multicast switch according to claim 4, wherein the 1×2 splitter is an asymmetrical splitter.

6. The multicast switch according to claim 3, wherein the optical switch units include a first optical switch unit comprising a 1×2 splitter in a preceding stage and a second optical switch unit not comprising the 1×2 splitter, and
optical switch units connected to the output ports are the second optical switch units.

7. The multicast switch according to claim 6, wherein the 1×2 splitter is an asymmetrical splitter.

8. The multicast switch according to claim 3, wherein at least one optical switch unit of the M×N optical switch units comprises the plurality of gate switches.

9. The multicast switch according to claim 2, wherein at least one optical switch unit of the M×N optical switch units comprises the plurality of gate switches.

10. The multicast switch according to claim 1, wherein the optical switch units include a first optical switch unit comprising a 1×2 splitter in a preceding stage and a second optical switch unit not comprising the 1×2 splitter, and optical switch units connected to the output ports are the second optical switch units.

11. The multicast switch according to claim 10, wherein the 1×2 splitter is an asymmetrical splitter.

12. The multicast switch according to claim 1, wherein at least one optical switch unit of the M×N optical switch units comprises the plurality of gate switches.

13. A multicast switch formed on a high-refractive-index waveguide substrate, comprising:
   M input ports to which optical signals are input, the input ports being associated with different numbers out of first numbers 1, ..., M;
   N output ports from which the optical signals are output, the output ports being associated with different numbers out of second numbers 1, ..., N;
   M×N optical switch units associated with different pairs of numbers [m, n], where m is an integer satisfying 1≤m≤M and corresponds to the first numbers and n is an integer satisfying 1≤n≤N and corresponds to the second number;
   optical waveguides optically connecting the M input ports, the M×N optical switch units, and the N output ports; and
   leads connected to the M×N optical switch units, respectively, to control activation/deactivation of the optical switch units,
   wherein by activating one optical switch unit of the M×N optical switch units, an optical signal input to the input port associated with the first number associated with the activated optical switch unit is output from the output port associated with the second number associated with the activated optical switch unit,
   the M×N optical switch units include at least a gate switch that is a 1×1 switch and a main switch that is a 2×1 switch provided in a subsequent stage of the gate switch, and
   in each of the optical switch units, the gate switch and the main switch are connected to a common lead,
   wherein the optical switch units include a first optical switch unit comprising a 1×2 splitter in a preceding stage and a second optical switch unit not comprising the 1×2 splitter, and
   optical switch units connected to the output ports are the second optical switch units.

14. The multicast switch according to claim 13, wherein a plurality of optical switch units of the M×N optical switch units are arrayed at least linearly.

15. The multicast switch according to claim 14, wherein the plurality of optical switch units are arrayed in a lattice pattern.

16. The multicast switch according to claim 13, wherein the 1×2 splitter is an asymmetrical splitter.

17. The multicast switch according to claim 13, wherein at least one optical switch unit of the M×N optical switch units comprises the plurality of gate switches.

* * * * *